US012608195B1

(12) United States Patent
Long et al.

(10) Patent No.: US 12,608,195 B1
(45) Date of Patent: Apr. 21, 2026

(54) SYSTEM TO BUILD AND MANAGE USER-FACING INTEGRATIONS IN SOFTWARE APPLICATIONS

(71) Applicant: Onset Labs, Inc., San Francisco, CA (US)

(72) Inventors: Zhaoyan Long, San Francisco, CA (US); Ayan Barua, San Francisco, CA (US)

(73) Assignee: Onset Labs, Inc., San Francisco, CA (US)

( * ) Notice: Subject to any disclaimer, the term of this patent is extended or adjusted under 35 U.S.C. 154(b) by 197 days.

(21) Appl. No.: 18/423,691

(22) Filed: Jan. 26, 2024

Related U.S. Application Data

(60) Provisional application No. 63/441,735, filed on Jan. 27, 2023.

(51) Int. Cl.
G06F 8/71 (2018.01)

(52) U.S. Cl.
CPC ..................................... G06F 8/71 (2013.01)

(58) Field of Classification Search
None
See application file for complete search history.

(56) References Cited

U.S. PATENT DOCUMENTS

| | | | | |
|---|---|---|---|---|
| 2010/0234009 A1* | 9/2010 | Antani | ................... | H04L 67/306 |
| | | | | 455/419 |
| 2012/0283020 A1* | 11/2012 | Kim | ...................... | A63F 13/795 |
| | | | | 463/42 |

| | | | | |
|---|---|---|---|---|
| 2015/0065253 A1* | 3/2015 | Joo | ......................... | A63F 13/73 |
| | | | | 463/42 |
| 2017/0041504 A1* | 2/2017 | Fukuda | ............... | H04L 63/0807 |
| 2019/0042206 A1* | 2/2019 | Hulbert | ............... | H04L 61/5076 |
| 2019/0111345 A1* | 4/2019 | Joo | ........................ | A63F 13/537 |
| 2020/0401465 A1* | 12/2020 | Douglas | ................. | G16H 40/00 |
| 2021/0105331 A1* | 4/2021 | Deo | ..................... | H04L 67/1001 |
| 2021/0226957 A1* | 7/2021 | Rayner | ................... | H04L 67/14 |
| 2023/0140595 A1* | 5/2023 | Somerhalder, Jr. | ..... | G06F 9/547 |
| | | | | 707/723 |
| 2023/0177563 A1* | 6/2023 | Carey | ................ | G06Q 30/0261 |
| | | | | 705/14.1 |
| 2023/0188431 A1* | 6/2023 | Esposito | ................. | H04L 41/28 |
| | | | | 709/225 |
| 2024/0069934 A1* | 2/2024 | Akkapeddi | ............ | G06N 20/20 |

OTHER PUBLICATIONS

Lomotey et al., "SaaS Authentication Middleware for Mobile Consumers of IaaS Cloud," IEEE, 2013. (Year: 2013).*
Rafique et al., "Policy-Driven Data Management Middleware for Multi-Cloud Storage in Multi-Tenant SaaS," IEEE, 2015. (Year: 2015).*

* cited by examiner

*Primary Examiner* — Ryan D. Coyer
(74) *Attorney, Agent, or Firm* — Van Pelt, Yi & James LLP

(57) ABSTRACT

In various embodiments, a process for building and managing user-facing integrations in software applications includes using configuration data associated with an end user of a first party service to determine a manner in which to obtain data of the end user from a third party data source for use in providing a service of the first party service to the end user. The process includes obtaining the data of the end user, including by making a call via the communication interface to the third party data source based at least in part on the determined manner in which to obtain the data of the end user. The process includes using the obtained data to provide the first party service to the end user.

19 Claims, 25 Drawing Sheets

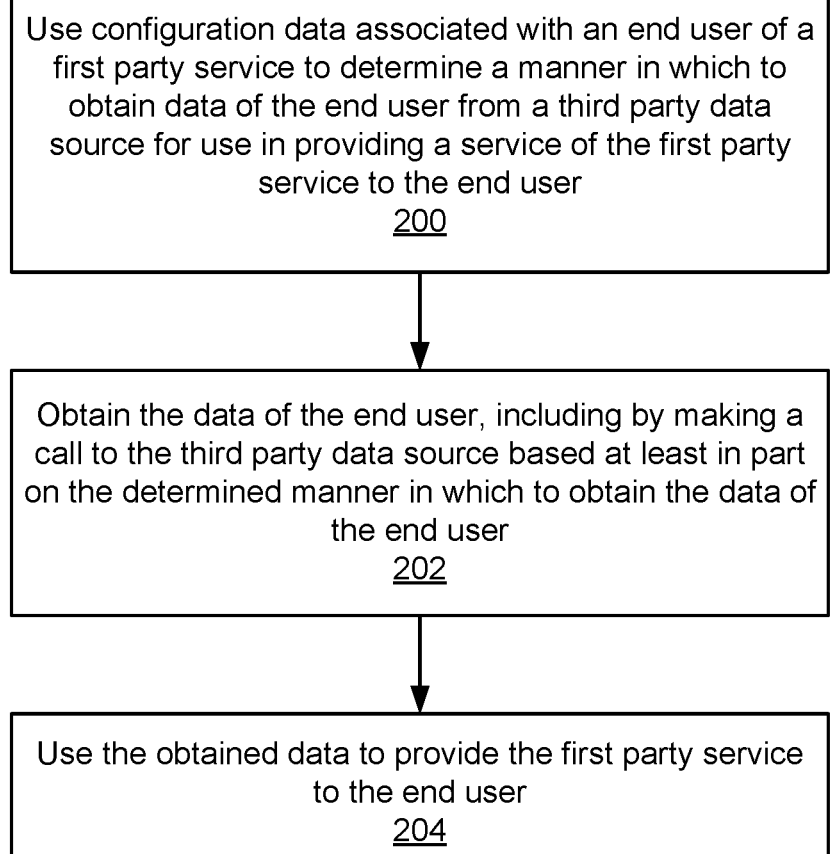

Use configuration data associated with an end user of a first party service to determine a manner in which to obtain data of the end user from a third party data source for use in providing a service of the first party service to the end user
200

Obtain the data of the end user, including by making a call to the third party data source based at least in part on the determined manner in which to obtain the data of the end user
202

Use the obtained data to provide the first party service to the end user
204

FIG. 2

```
integrations:
# INTEGRATION 1
# Read account and contact info from TP1, and write to DB1.
- name: read-account-contact-from-TP1
  type: readIncrementalToDB1
  api: TP1
  frequency: every 2 hours
  objects:
    - objectName: account
      dbTableName: TP1Accounts # which DB1 table to write to
      # Always read and/or update these fields
      requiredFields:
        - fieldName: name
          transform: capitalizeNames.js # (custom) function in JS
        - fieldName: industry
        - fieldName: mailingAddress
      # Ask user during set up if they want to read these fields
      optionalFields:
        - fieldName: annualRevenue
      calculatedFields:
        # Priority is a field that doesn't exist in TP1 but is calculated
        # from other fields using a (custom) function
        - fieldName: priority
          fieldType: enum (low, med, high)
          calculation: calcPriorityFromIndustryAndAddress.js

- objectName: contact
      dbTableName: TP1Contacts
      customFields:
        # Ask user during set up which custom fields should map to the DB1
column.
        - destinationName: pronoun
          # Prompt to display to end user in the embeddable UI.
          prompt: We will use when addressing this contact in emails we send
out.
```

FIG. 3A

```
# INTEGRATION 2
# Write to TP1 as soon a new row is created in the sentEmails DB1 table
- name: record-emails-in-TP1
  type: writeAppendFromDB1
  api: TP1
  frequency: realtime
  objects:
    - objectName: sentEmail
      # Create this custom object during set up
      createCustom:
        displayName: Sent Email
        childOf: Contact
      # Prompt to display to end user in the embeddable UI
      prompt: >
        We will sync all sent emails to this custom object within your TP1.
      dbTableName: sentEmails

# INTEGRATION 3
# Get notified in my endpoint whenever a Hubspot contact is created, updated,
# or deleted.
- name: subscribe-to-contacts
  type: notifyToEndpoint
  api: hubspot
  objects:
    - objectName: contact
      changeType: create
      endpoint: ${MY_ENDPOINT}/new-hubspot-contact
      requiredFields: ...
    - objectName: contact
      changeType: update
      endpoint: ${MY_ENDPOINT}/updated-hubspot-contact
      requiredFields: ...
    - objectName: contact
      changeType: delete
      endpoint: ${MY_ENDPOINT}/deleted-hubspot-contact
      requiredFields: ...

# INTEGRATION 4
# Create a new contact in Hubspot every time my app makes a request to an
endpoint
- name: create-contacts
  type: writeFromEndpoint
  api: hubspot
  objects:
    - objectName: contact
      endpoint: ${REMOTE_ENDPOINT}/create-hubspot-contact
      ...
```

FIG. 3B

Objects
410

Step 1/4

TP1

Subdomain [          ] .my.TP1.com

Username [                    ]

Password [                    ]

[Cancel]　　[Next]

Step 2/4

We will read the following fields from your Accounts on TP1:

Name

Industry

Mailing Address

We will optionally read the following fields from your Accounts on TP1:

Annual Revenue

[Do this later]　　[Next]

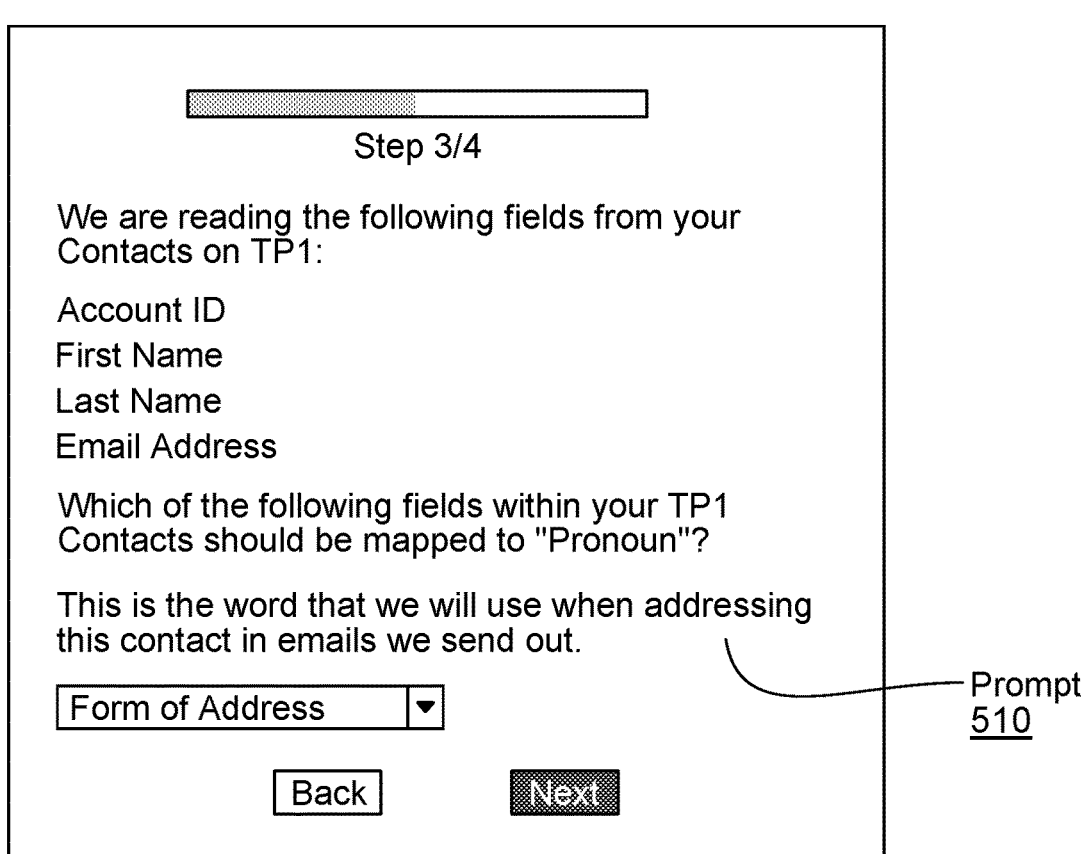

Step 3/4

We are reading the following fields from your Contacts on TP1:

Account ID
First Name
Last Name
Email Address

Which of the following fields within your TP1 Contacts should be mapped to "Pronoun"?

This is the word that we will use when addressing this contact in emails we send out.

Form of Address ▼

Back     Next

Prompt
510

FIG. 5C

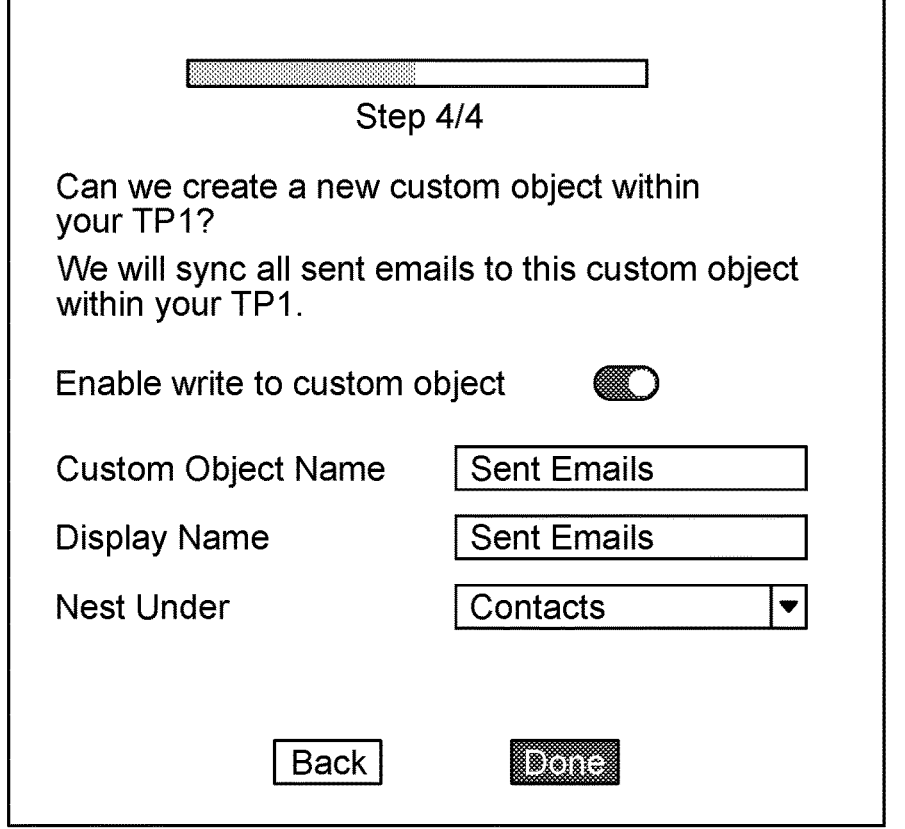

Step 4/4

Can we create a new custom object within your TP1?
We will sync all sent emails to this custom object within your TP1.

Enable write to custom object

Custom Object Name     Sent Emails

Display Name     Sent Emails

Nest Under     Contacts ▼

Back     Done

FIG. 5D

TP1 Integration

READING

We are reading the following fields from your Accounts on TP1:

Name
Industry
Mailing Address
Annual Revenue

We are reading the following fields from your Contacts on TP1:

Account ID
First Name
Last Name
Email Address

Which of the following fields within your TP1 Contacts should be mapped to "Pronoun"?

This is the word that we will use when addressing this contact in emails we send out.

| Form of Address ▼ |

WRITING

Custom object we will write to:

We will sync all sent emails to this custom object within your Salesforce.

| Sent Emails |

| Save Changes |   | Reset |

FIG. 5E

Receive an outgoing request to a third party data source, wherein the outgoing request is associated with an end user of a first party service
800

Receive a response associated with the outgoing request
802

Determine a representation of the outgoing request and the response
804

Output a management console including the determined representation
806

INTEGRATION SERVICE

Settings ⚙

Dashboard

Customers

Integration sources

Alerts

Builder

Playground

Docs

Changelog

Help center

Settings

← Back to all integration sources

TP1

○ TP1 API Status: Healthy

♀ Recommended Action
It looks like a lot of your customers who've installed this integration are experiencing quota issues. You may want to consider switching over to the Bulk API, which is more optimized for high volume. See documentation here.

Instances of TP1 integration (9 instances, 8 customers)

All | Healthy | Degraded | Broken

Search customers ○

| Customer | Workspace | Activity in past 6 days | Current status | |
|---|---|---|---|---|
| InteractApp | Dev | ▨▨▨▨ | Healthy | See details |
| SalesCommissionSaaS | Dev | ▨▨▨▨ | Broken | See details |
| SalesCommissionSaaS | Prod | ▨▨▨▨ | Degraded | See details |
| OptimizeForce | Default | ▨▨▨▨ | Healthy | See details |
| CustomerFlow | Default | ▨▨▨▨ | Healthy | See details |
| DealCloser | Default | ▨▨▨▨ | Healthy | See details |
| Video | Default | ▨▨▨▨ | Healthy | See details |

FIG. 9B

INTEGRATION SERVICE

Dashboard

Customers

Integration sources

Alerts

Builder

Playground

Docs

Changelog

Help center

Settings

← Back to all instances of TP1 integration (9 instances, 8 customers)     [Sync ↻]   [Pasue ‖]

TP1 integration on InteractApp's Dev Workspace   (Broken)

○ TP1 API Status: Healthy

ACTIVITY   SCHEDULE & CONFIG   AUTH DETAILS   ALERT CHANNELS

♡ It looks like this integration is failing due to permission errors.
The user may have modified the permission levels of the linked TP1 account, or the account may have been deleted. Click the "Auth Details" tab to learn more.

| Operation | Status | Data | Time |
|---|---|---|---|
| Read | Failed with permission error | accounts; opportunities | Oct 14 2022 23:32:34 UTC | See details |
| Write | Failed because duplicate was detected | owner | Oct 14 2022 13:32:34 UTC | See details |
| Write | Success | notes | Oct 13 2022 3:32:34 UTC | See details |
| Read | Successful request but no data was returned | accounts; opportunities | Oct 13 2022 13:32:34 UTC | See details |
| Write | Failed because last name was missing | accounts | Oct 13 2022 11:32:34 UTC | See details |
| Read | Success | accounts; opportunities | Oct 13 2022 9:32:34 UTC | See details |

FIG. 9C

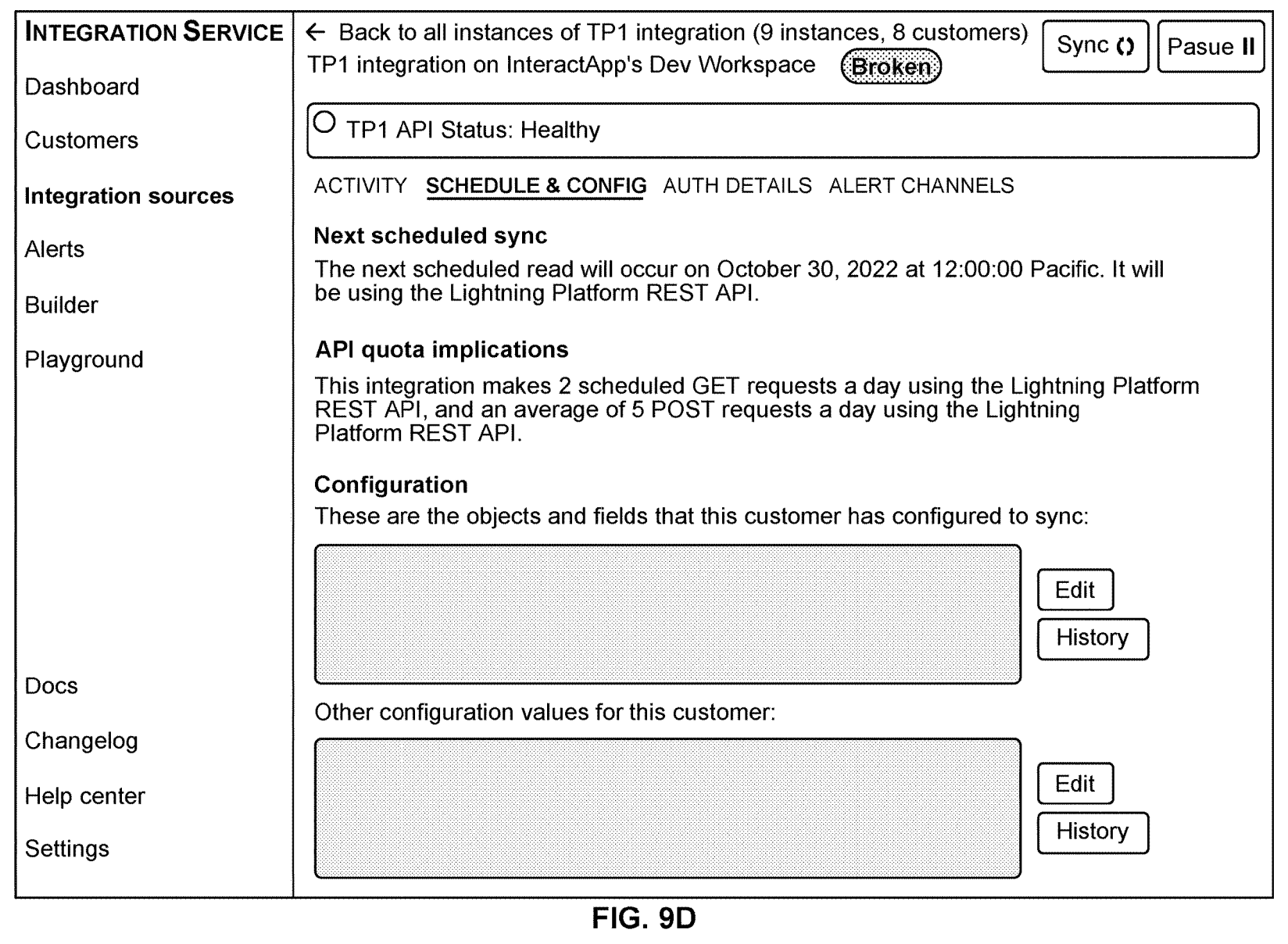

INTEGRATION SERVICE    Sync ○    Pasue ‖

Dashboard

Customers

Integration sources

Alerts

Builder

Playground

Docs

Changelog

Help center

Settings

← Back to all instances of TP1 integration (9 instances, 8 customers)

TP1 integration on InteractApp's Dev Workspace    Broken

○ TP1 API Status: Healthy

ACTIVITY    SCHEDULE & CONFIG    AUTH DETAILS    ALERT CHANNELS

Next scheduled sync

The next scheduled read will occur on October 30, 2022 at 12:00:00 Pacific. It will be using the Lightning Platform REST API.

API quota implications

This integration makes 2 scheduled GET requests a day using the Lightning Platform REST API, and an average of 5 POST requests a day using the Lightning Platform REST API.

Configuration

These are the objects and fields that this customer has configured to sync:

Edit

History

Other configuration values for this customer:

Edit

History

FIG. 9D

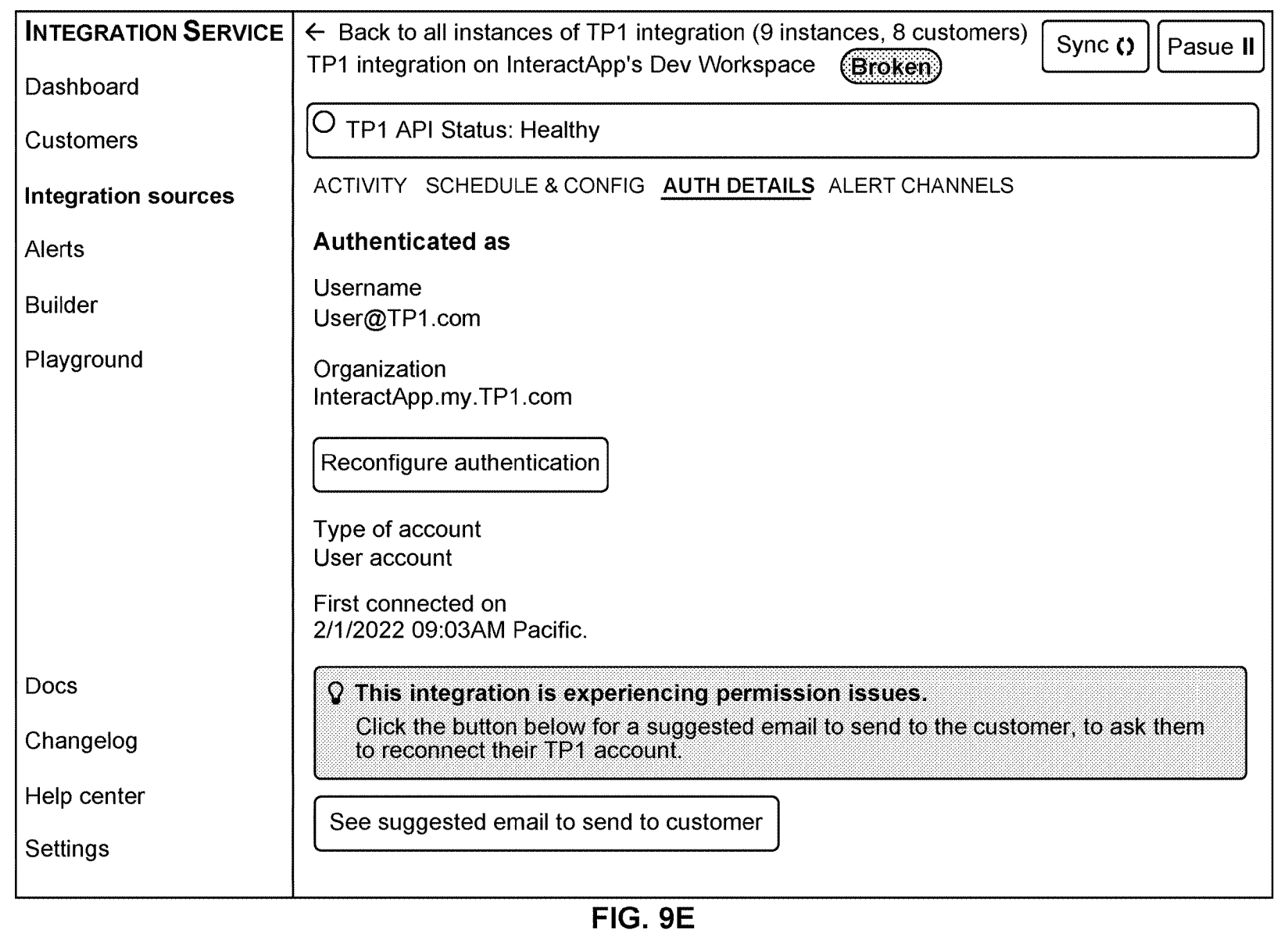

INTEGRATION SERVICE                                                Sync ↻    Pasue ‖

Dashboard                    ← Back to all instances of TP1 integration (9 instances, 8 customers)
                             TP1 integration on InteractApp's Dev Workspace    Broken
Customers
                             ○ TP1 API Status: Healthy
Integration sources
                             ACTIVITY   SCHEDULE & CONFIG   AUTH DETAILS   ALERT CHANNELS
Alerts
                             Authenticated as
Builder
                             Username
                             User@TP1.com
Playground
                             Organization
                             InteractApp.my.TP1.com Reconfigure authentication Type of account
                             User account First connected on
                             2/1/2022 09:03AM Pacific.

♀ This integration is experiencing permission issues.
Docs                            Click the button below for a suggested email to send to the customer, to ask them
Changelog                       to reconnect their TP1 account.

Help center
                             See suggested email to send to customer
Settings

FIG. 9E

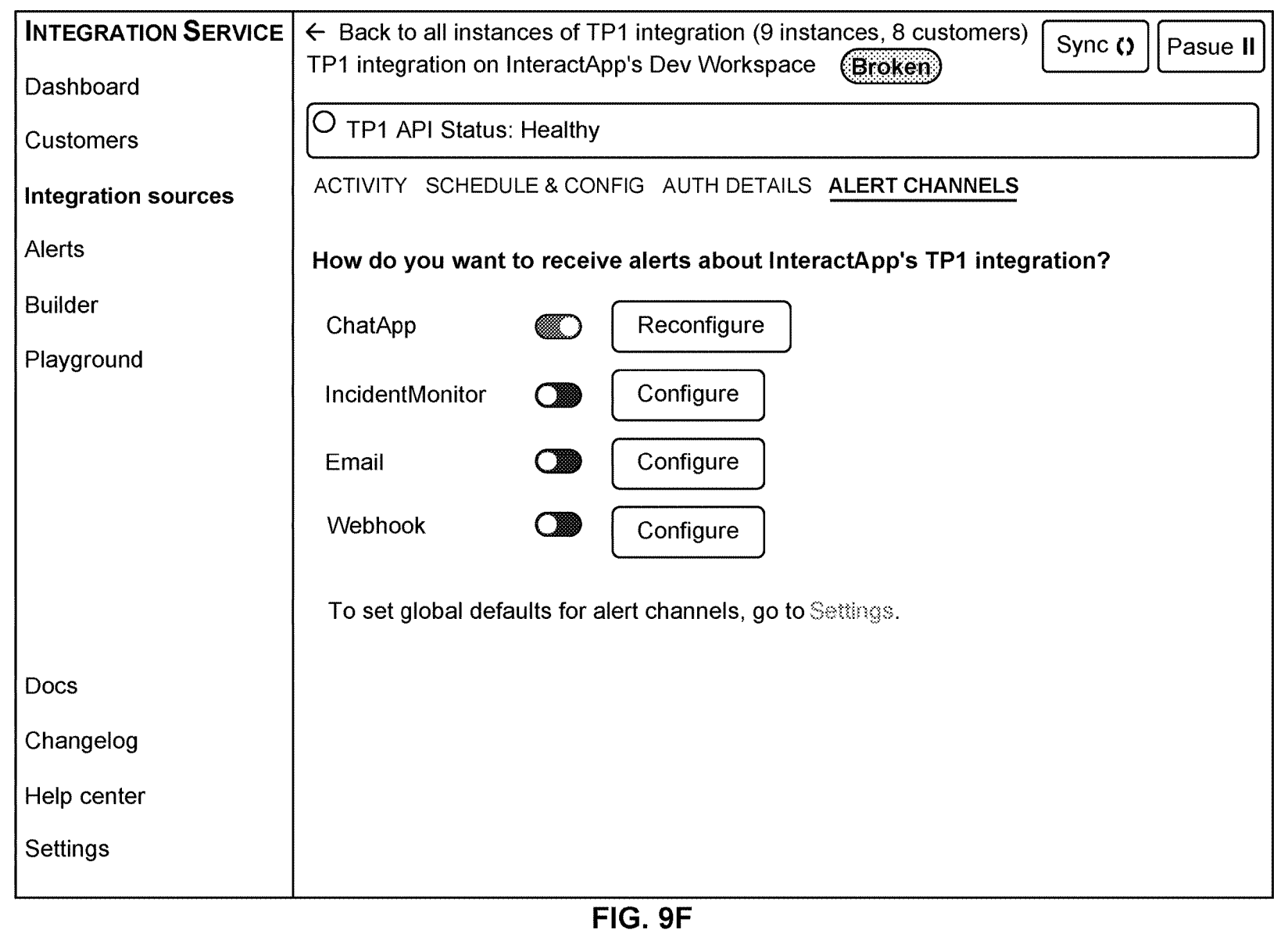

INTEGRATION SERVICE

Dashboard

Customers

Integration sources

Alerts

Builder

Playground

Docs

Changelog

Help center

Settings

← Back to all instances of TP1 integration (9 instances, 8 customers)

TP1 integration on InteractApp's Dev Workspace    (Broken)

Sync ↻    Pasue ‖

○ TP1 API Status: Healthy

ACTIVITY   SCHEDULE & CONFIG   AUTH DETAILS   <u>ALERT CHANNELS</u>

How do you want to receive alerts about InteractApp's TP1 integration?

ChatApp    ◖    [ Reconfigure ]

IncidentMonitor    ◖    [ Configure ]

Email    ◖    [ Configure ]

Webhook    ◖    [ Configure ]

To set global defaults for alert channels, go to Settings.

FIG. 9F

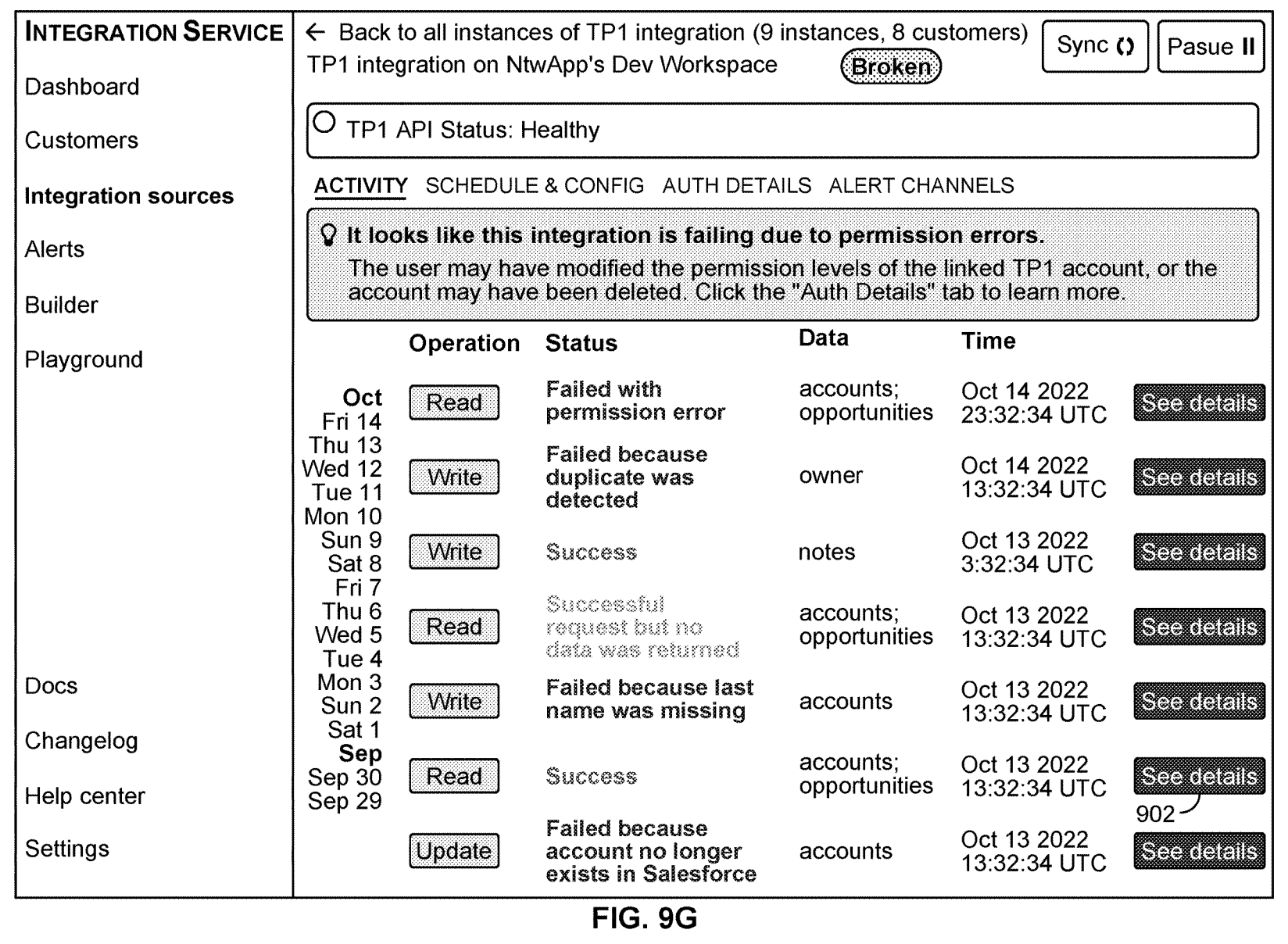

INTEGRATION SERVICE

Dashboard

Customers

Integration sources

Alerts

Builder

Playground

Docs

Changelog

Help center

Settings

← Back to all instances of TP1 integration (9 instances, 8 customers)   Sync ↻   Pasue ▮▮

TP1 integration on NtwApp's Dev Workspace   (Broken)

○ TP1 API Status: Healthy

ACTIVITY   SCHEDULE & CONFIG   AUTH DETAILS   ALERT CHANNELS

💡 It looks like this integration is failing due to permission errors.
The user may have modified the permission levels of the linked TP1 account, or the
account may have been deleted. Click the "Auth Details" tab to learn more.

| | Operation | Status | Data | Time |
|---|---|---|---|---|
| Oct<br>Fri 14<br>Thu 13 | Read | Failed with permission error | accounts; opportunities | Oct 14 2022 23:32:34 UTC | See details |
| Wed 12<br>Tue 11<br>Mon 10 | Write | Failed because duplicate was detected | owner | Oct 14 2022 13:32:34 UTC | See details |
| Sun 9<br>Sat 8<br>Fri 7 | Write | Success | notes | Oct 13 2022 3:32:34 UTC | See details |
| Thu 6<br>Wed 5<br>Tue 4 | Read | Successful request but no data was returned | accounts; opportunities | Oct 13 2022 13:32:34 UTC | See details |
| Mon 3<br>Sun 2<br>Sat 1 | Write | Failed because last name was missing | accounts | Oct 13 2022 13:32:34 UTC | See details |
| Sep<br>Sep 30<br>Sep 29 | Read | Success | accounts; opportunities | Oct 13 2022 13:32:34 UTC | See details — 902 |
| | Update | Failed because account no longer exists in Salesforce | accounts | Oct 13 2022 13:32:34 UTC | See details |

FIG. 9G

INTEGRATION SERVICE

Dashboard

Customers

Integration sources

Alerts

Builder

Playground

Docs

Changelog

Help center

Settings

Customers

| All | Have degraded integrations ◉ | Have broken integrations ● |

Search customers 🔍

| Customer | Workspace | TP1 Integrations | TP2 Integrations | |
|---|---|---|---|---|
| OptimizeForce | Default | Broken | Broken | See details |
| CustomerFlow | Default | Degraded | Degraded | See details |
| DealCloser | Default | Success | Degraded | See details |
| InteractApp | Dev | Success | Success | See details |
| InteractApp | Test | Success | Success | See details |
| SalesCommissionSaaS | Workspace | Success | Success | See details |

FIG. 10B

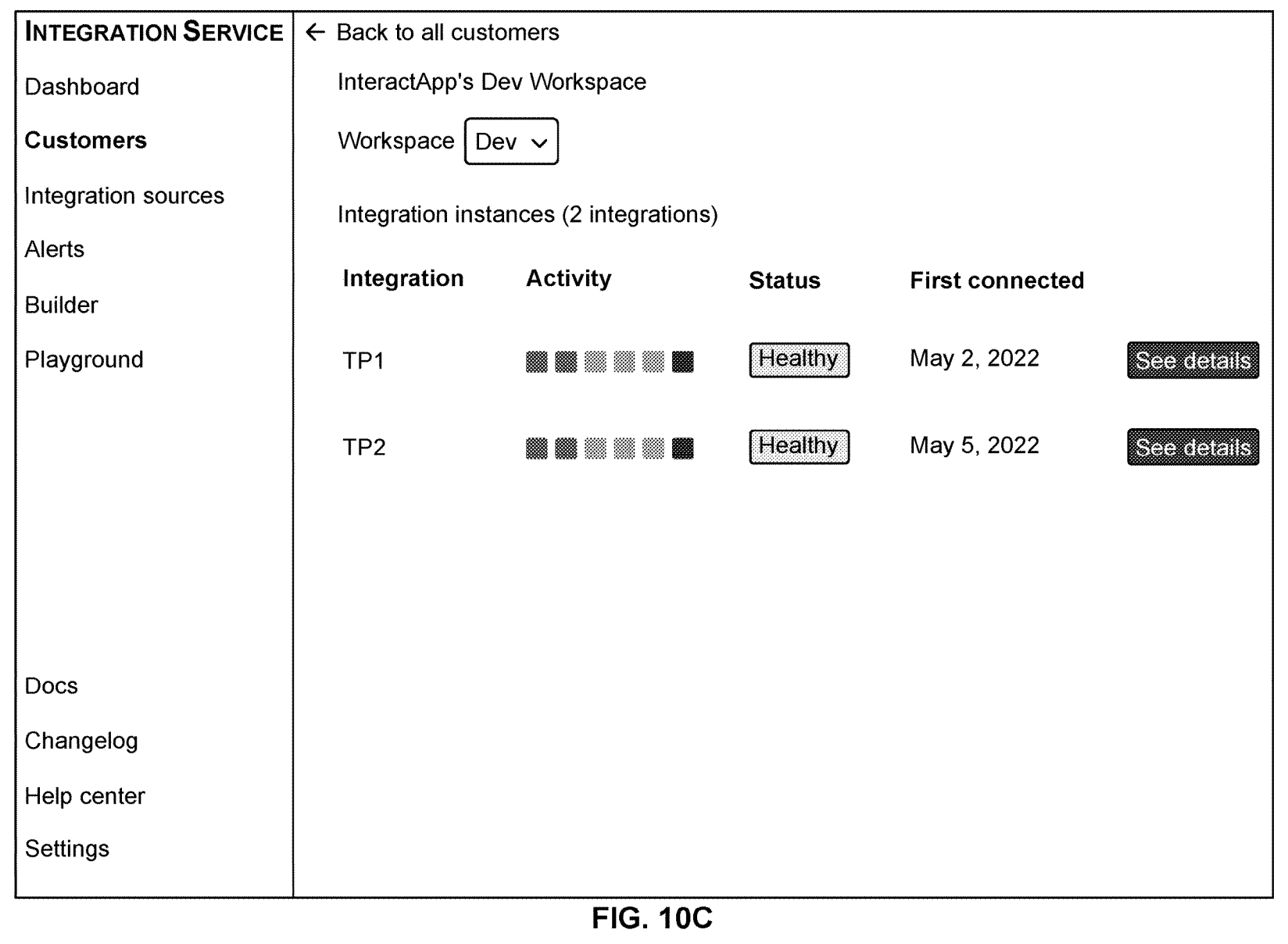

INTEGRATION SERVICE

Dashboard

Customers

Integration sources

Alerts

Builder

Playground

Docs

Changelog

Help center

Settings

← Back to all customers

InteractApp's Dev Workspace

Workspace [ Dev ⌄ ]

Integration instances (2 integrations)

| Integration | Activity | Status | First connected | |
|---|---|---|---|---|
| TP1 | ▮▮▮▮ | Healthy | May 2, 2022 | See details |
| TP2 | ▮▮▮▮ | Healthy | May 5, 2022 | See details |

FIG. 10C

SYSTEM TO BUILD AND MANAGE USER-FACING INTEGRATIONS IN SOFTWARE APPLICATIONS

CROSS REFERENCE TO OTHER APPLICATIONS

This application claims priority to U.S. Provisional Patent Application No. 63/441,735 entitled SYSTEM TO BUILD AND MANAGE USER-FACING INTEGRATIONS IN SOFTWARE APPLICATIONS filed Jan. 27, 2023 which is incorporated herein by reference for all purposes.

BACKGROUND OF THE INVENTION

Software as a service (SaaS) refers to centrally hosted computer programs or applications that allow users to connect to and use the applications over the cloud or Internet. The SaaS applications may be provided by various organizations. A SaaS application may be integrated or otherwise made interoperable with other computer programs such as other cloud-based applications or on-premises software. For example, an organization that uses various SaaS applications connects to the applications via application programming interfaces (APIs). However, it may be challenging to provide SaaS integrations because of inconsistent APIs, esoteric setups, or insufficient synchronization pipelines.

BRIEF DESCRIPTION OF THE DRAWINGS

Various embodiments of the invention are disclosed in the following detailed description and the accompanying drawings.

FIG. 2 is a flow diagram illustrating an embodiment of a process for building and managing user-facing integrations in software applications.

FIG. 3A shows an example of a configuration file.

FIG. 3B shows an example of a configuration file. This is a continuation of the configuration file shown in FIG. 3A.

FIG. 5C shows an example of an embeddable user interface for building and managing user-facing integrations in software applications.

FIG. 5D shows an example of an embeddable user interface for building and managing user-facing integrations in software applications.

FIG. 5E shows an example of an embeddable user interface for building and managing user-facing integrations in software applications.

FIG. 9B shows an example of an integration sources section of a management console for an integration system.

FIG. 9C shows an example of an integration sources section of a management console for an integration system.

FIG. 9D shows an example of an integration sources section of a management console for an integration system.

FIG. 9E shows an example of an integration sources section of a management console for an integration system.

FIG. 9F shows an example of an integration sources section of a management console for an integration system.

FIG. 9G shows an example of an integration sources section of a management console for an integration system.

FIG. 10B shows an example of an alternative way to display the information of FIG. 10A.

FIG. 10C shows an example of another way to display information about integration instances for a particular end user.

DETAILED DESCRIPTION

Figure 1:
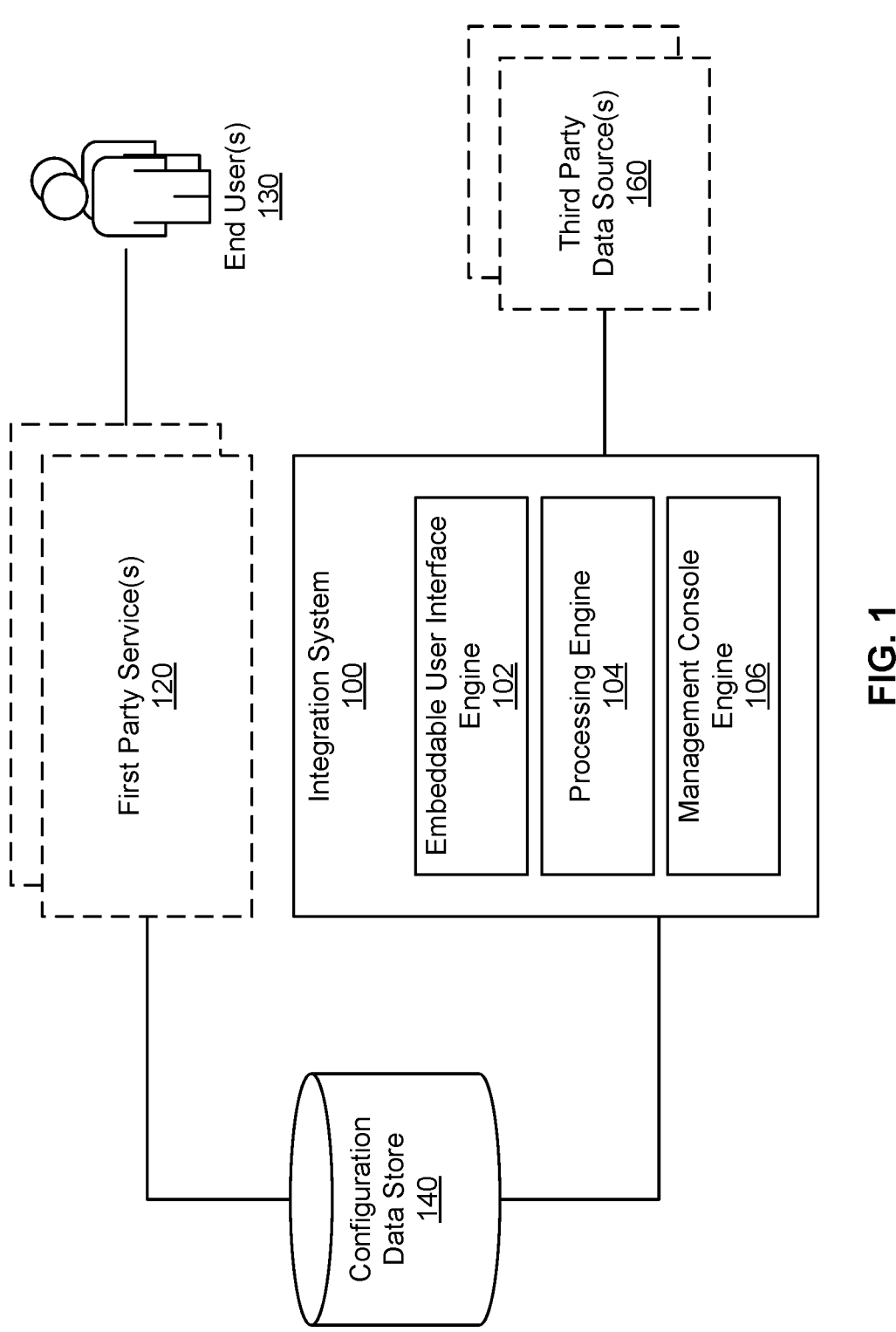
FIG. 1 is a block diagram illustrating an embodiment of a system for building and managing user-facing integrations in software applications.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to build and manage integrations for a first party service. As used herein, a "first party service" refers to a service provided to an "end user" via a computer program. The first party service may include Software as a Service (SaaS) or other type of computer application. The first party service may access data associated with the end user from a "third party data source" to provide the first party service. A developer or other user associated with the first party service is referred to herein as a "builder." In the context of creating and managing the first party service, "first party service" and "builder" are used interchangeably herein.

For example, a first party service is a video conferencing and communication system. The end user of the video conferencing and communication system is a company. The company has contacts (e.g., an address book) stored in a third party data source. The disclosed techniques allow a first party service to manage integrations with one or more third party data sources.

Conventional integration techniques typically use no-code drag and drop editors, unified application programming interfaces (APIs), Representational State Transfer (REST) APIs, or software development kits (SDKs) as the method for defining the behavior of integrations. No-code drag and drop editors and unified API tools typically offer limited configurability because the first party service is restricted to functions offered by the no-code or unified API tool. The first party service is not able to build specific integrations for particular third party data sources. Alternatively, to directly integrate with a third party data source, a builder may write code to directly communicate with the third party data source API. This code is included in the first party service's application. However, this process is laborious because the builder typically needs to separately write code for user interface (UI) components and develop logging and telemetry methods. Moreover, there are many different third party data sources for which the builder needs to write code.

Techniques for building and managing user-facing integrations in software applications are disclosed. The disclosed techniques offer increased configurability/customizability and version control for integrations. In various embodiments, a system as disclosed herein uses configuration data as a primary way to define an integration. The configuration file may be maintained alongside the rest of a first party service's code base such as a Git repository, which enables a builder to manage branching and versions of the configuration file. The builder is able to leverage all of the fields and objects that exist for a specific third party data source and to exercise granular control over configuration options for end users. For example, mapping gives an end user a choice of which objects and fields to use as further described herein.

The disclosed techniques enable builders to create and manage user-facing integrations in their first party services (e.g., software applications). Examples include integrations which read data from, write data to, and/or subscribe to data changes from their end users' third party data sources, such as Client Relationship Management (CRM) software, Enterprise Resource Planning (ERP) software, accounting software, information technology (IT) software, human resources (HR) software, Applicant Tracking Systems, etc. In various embodiments, a system as disclosed herein includes one or more of the following: hosted software, downloadable software, hosted data stores, software development kits (SDKs), and application programming interfaces (APIs). These components are building blocks which help engineers create deep, customer-configurable, and easily manageable integrations.

Figure 4A:
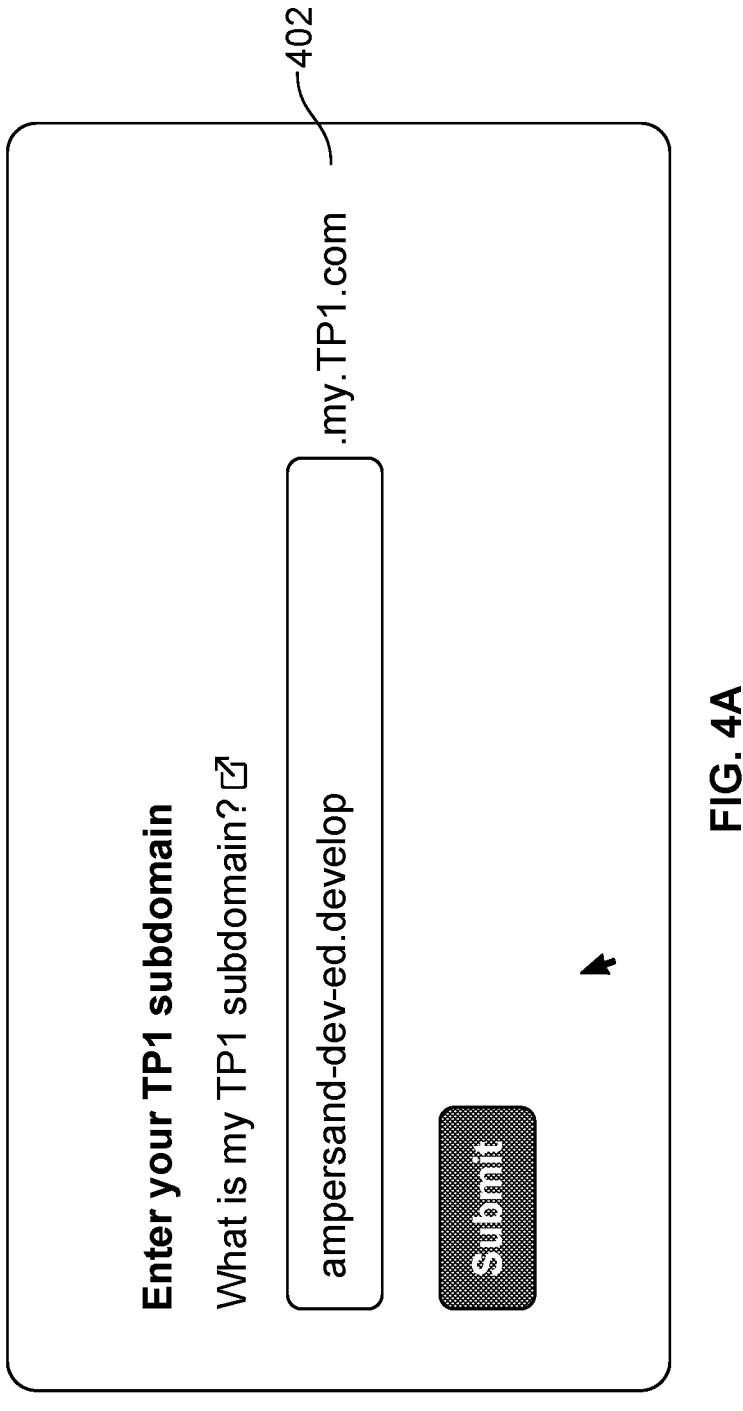
FIG. 4A shows an example of a user interface for displaying an integration installation component.
Figure 4B:
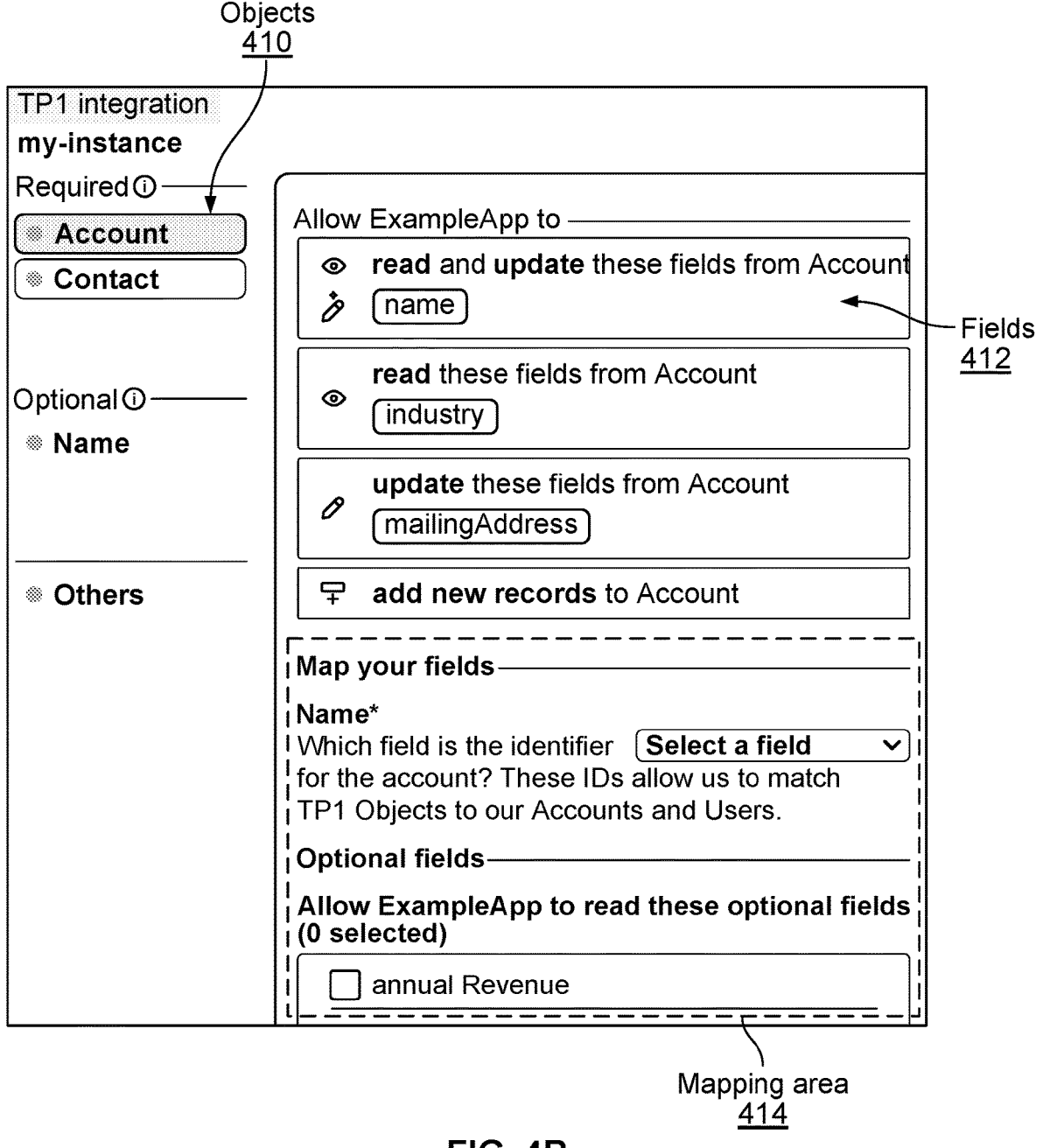
FIG. 4B shows an example of a user interface for displaying an integration configuration console.
Figures 5A, 5B:
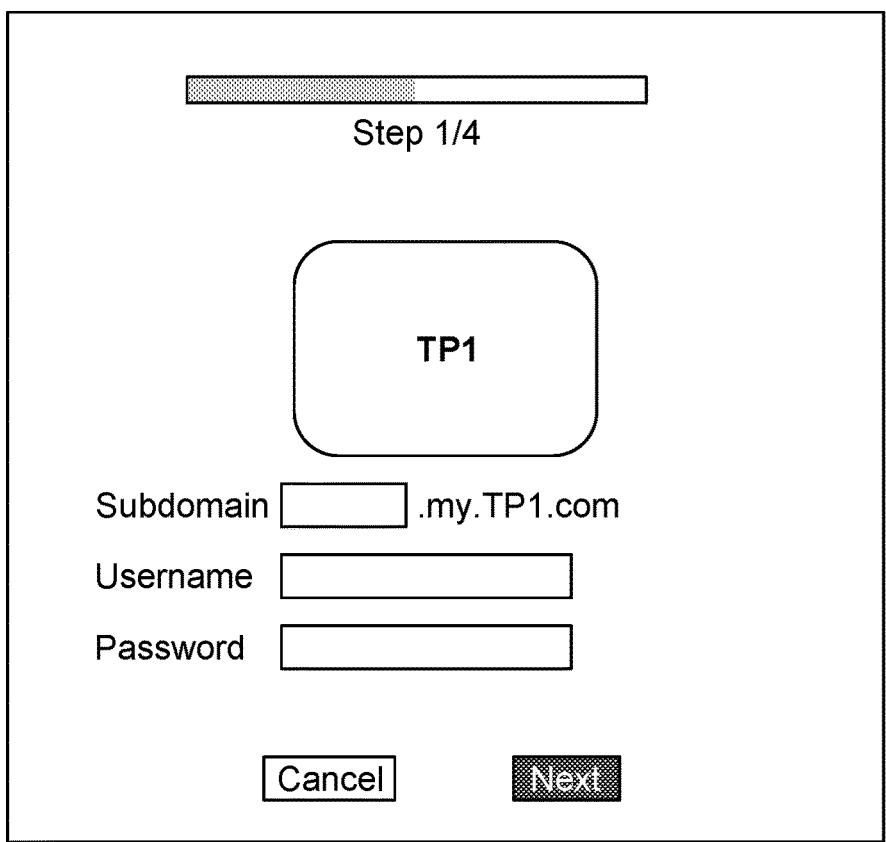
FIG. 5A shows an example of an embeddable user interface for building and managing user-facing integrations in software applications.
FIG. 5B shows an example of an embeddable user interface for building and managing user-facing integrations in software applications.
Figure 6:
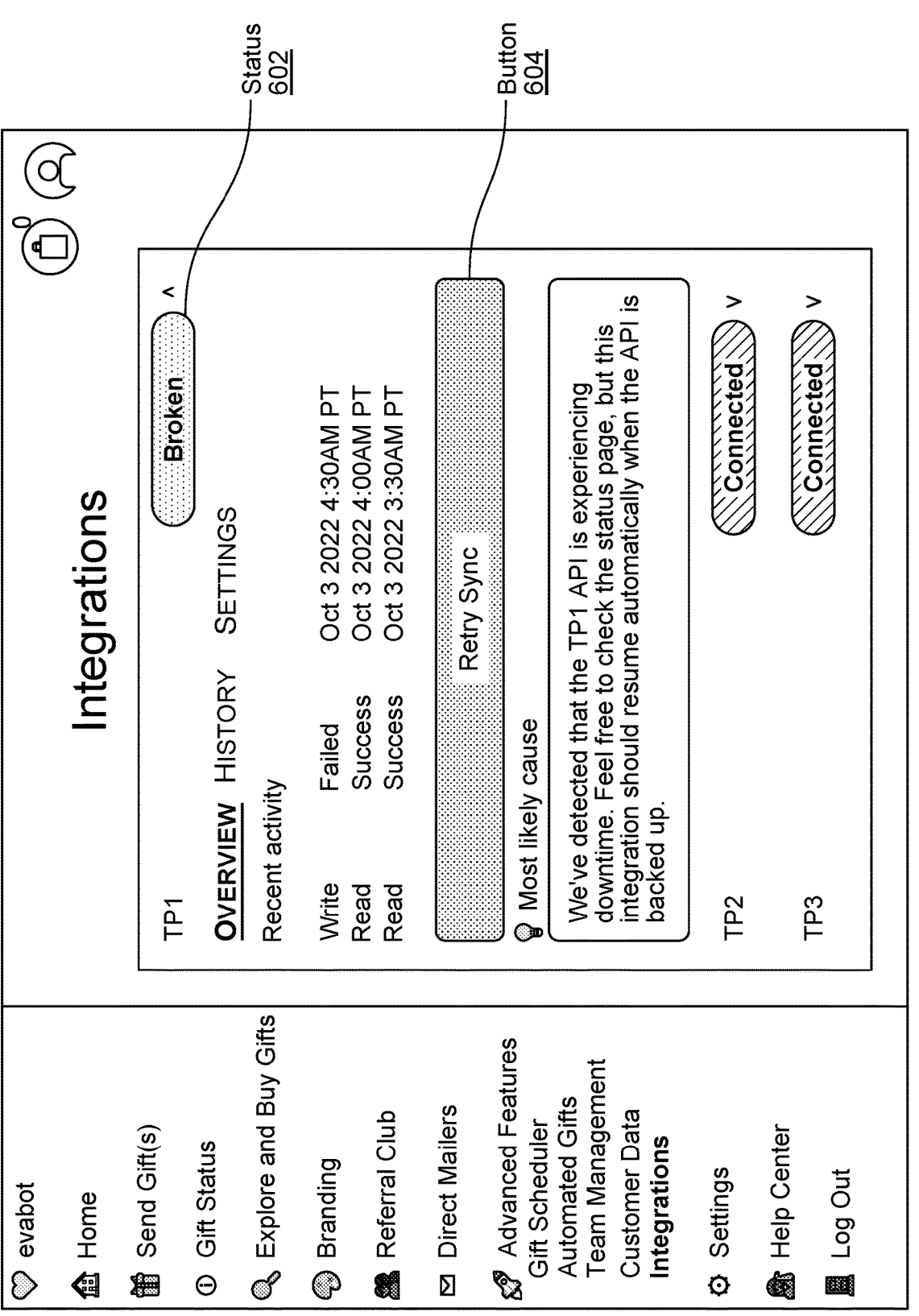
FIG. 6 shows an example of an embeddable user interface for building and managing user-facing integrations in software applications.

First, an example integration system is described (FIG. 1). Next, a process for building and managing user-facing integrations is described (FIG. 2). An example of configuration data is described (FIGS. 3A and 3B), followed by an example of a user interface for building and managing user-facing integrations (FIGS. 4A and 4B). Examples of embeddable user interfaces are then described (FIGS. 5A to 6). Finally, a process for creating a management console and example user interfaces are described (FIGS. 7 to 11).

FIG. 1 is a block diagram illustrating an embodiment of a system for building and managing user-facing integrations in software applications. The system includes an integration system 100 and a configuration data store 140.

The integration system is configured to provide integration services for one or more first party services 120 including by facilitating the integration of one or more third party data sources 160 with the one or more first party services. For simplicity, the examples herein chiefly describe a single first party service integrating with a single third party data source. However, this is not intended to be limiting, as a specific first party service may integrate with a first set of third party data sources. Another first party service may integrate with a second set of third party data sources, which may or may not overlap with the first set of third party data sources. The disclosed system manages integrations for one or more first party services with one or more third party data sources. The integration system may be self-hosted (e.g., by the first party service) or hosted in a cloud.

First party service 120 is configured to provide a service to an end user. The first party service may develop one or more user applications using the integration system 100. For example, an application builder (sometimes referred to simply as a "builder") uses the integration system by defining desired behavior via configuration data. The integration system parses the configuration data to determine appropriate calls to make to the third party data source 160. The builder may use the integration system throughout the lifecycle of an integration to manage the integration.

Configuration data store 140 is configured to store configuration data (also referred to as "end user configurations"). The data store may include one or more databases (e.g., Postgres or MySQL) or hosted storage solutions (e.g., provided by a cloud storage provider or a cloud data warehouse). The data store may be hosted locally or by an owner of the disclosed system or may be hosted by another entity such as a third party or a first party service. In various embodiments, the builder can either directly query the configuration store or interact with it through APIs and webhooks.

Configuration data may be created by a builder, automatically created by a computer program, or a combination thereof. Integrations may be defined via configuration data. Configuration data is sometimes referred to as "a configuration file," because the data may be included in or include a file. Configuration data defines one or more of the following: a type of integration, a type of data, configuration values available to end users, and how to connect to other parts of the application stack (e.g., direct connection to data stores, HTTP calls, webhooks, etc.).

In various embodiments, an integration definition in the configuration data drives one or more of:

prompts and available configuration fields presented to
      the end user, e.g., through embeddable UIs, underlying calls made by the integration system to third party data sources, e.g., frequency, request parameters, etc., data sanitation and transformation performed by the integration system, a way that the data is made available to the first party service, which can be through direct data store writes, API calls, SDKs, webhooks, etc., and a way that the third party service interacts with the integration system, which can be through database writes, API calls, SDKs, webhooks, etc.

In various embodiments, a configuration file influences the behavior of the integration system 100 and how an embeddable UI is created and/or rendered by the Embeddable UI Engine 102 as further described herein. Although depicted as external to the integration system 100, the configuration data store 140 may be included in (e.g., locally hosted by) the integration system.

A configuration file may be written in a variety of languages and formats, including but not limited to YAML, JSON, TypeScript, or JavaScript. In various embodiments, a syntax specification and/or a format/template/pattern of how users should write a configuration file are defined and provided. The configuration format provides an easy-to-use experience for engineers, and can support developer workflows such as Git version control and continuous development/continuous integration (CI/CD). In various embodiments, a library of template modules, which include configuration files, for common use cases is provided by the integration system 100. Template modules can be directly used or modified. Builders can also share their configuration files with others in the community of integration system users, e.g., as template modules.

The integration system 100 includes an embeddable user interface engine 102, a processing engine 104, and a management console engine 106.

The processing engine 104 is configured to analyze configuration data (e.g., stored in configuration data store 140) to determine actions to take with respect to the third party data source 160. In various embodiments, the processing engine 104 tracks each end user's configuration (where the end users are users of the first party service 120) and makes appropriate calls to third party data sources 160, while optimizing for cost and quota, handling retry logic and error message parsing, and the like. In various embodiments, the API calls made by the integration system are determined by the desired data objects and fields specified in the configuration file and the end user's configuration. The processing engine may transform (including sanitize) the data as further described herein.

In various embodiments, a builder interacts with the integration system 100 via a command line interface, which is a tool that allows the builder to deploy new configuration files, make changes to existing configuration files, test integrations (including locally), generate test data, test environments, among other things.

In various embodiments, a builder interacts with the integration system 100 via one or more APIs. The API may be provided by the third party data source such as a CRM or ERP platform/service. API calls may be made directly or the APIs may power the command line interface and/or the embeddable user interface as further described herein. Example calls include but are not limited to:

get all the available integrations for installation,
get information on the integration to install,
get current configuration of instance,
install new instance, patch the instance with configuration info,
uninstall an integration,
get recent activity logs for an integration,
pause an integration, and
manually trigger a sync.

The embeddable user interface engine 102 is configured to generate UI components that can be directly embedded within an application, such as an application of the first party service 120. A builder associated with the first party service or an end user 130 may interact with the UI components, which provide functionalities that include but are not limited to:

authenticating to the user's third party software product through protocols such as OAuth, setting up and configuring the integration, and troubleshooting the integration and the ability to take actions such as pausing the integration, manually triggering a data sync, or uninstalling the integration.

UI components may be embedded into an application in a variety of ways. For example, the UI components include Web components for front-end frameworks such as React, Next.js, Vue, etc. As another example, the UI components include React hooks and raw API endpoints, which provide data enabling application developers to create their own look and feel for the user flows.

Management console engine 106 is configured to provide a UI such as a dashboard allowing builders to monitor and troubleshoot integrations, and set up and manage end user configurations. The management console is sometimes simply referred to as a dashboard. For example, a user associated with the first party service such as an application builder, customer support, or product manager may access the management console to view integrations, troubleshoot the integrations, view analytics associated with the integrations such as how many end users installed the integrations, etc. In various embodiments, the management console provides functionalities including but not limited to:

viewing a list of end users that have installed integrations, viewing recent activity and logs of integrations and underlying API calls, setting up issue alerts through channels such as email, team chat, and Site Reliability Engineer (SRE) tools, and managing an end user's configuration, viewing the history of their configuration, pausing integrations and uninstalling integrations on behalf of the end user.

Examples of a management console are further described with respect to FIGS. 9A-11.

In various embodiments, the integration system 100 provides one or more sandboxes, which include environments that mimic the behavior and data schema of third party applications, which can be used to test an integration in development. One of the hardest parts of developing an integration is testing all the edge cases. The disclosed system offers the ability to programmatically create and delete sandboxes, which are imitations of third party tools that can be used for testing purposes. The system can also generate test data for populating the sandboxes, for both edge case testing and volume testing. The sandbox management and test data generation tools would be available to use even if the integration has been built manually or otherwise developed without using the integration system 100.

In operation, a builder associated with first party service 120 or an end user 130 defines desired behavior via configuration data. The integration system 100 receives the configuration data. For example, an application builder submits the configuration data to the integration system via an upload, command line interface, or other means. Alternatively, or in addition, the configuration data is collected via or used for one or more embeddable user interfaces. For example, content with which to populate an embedded UI is pulled from the configuration data. The integration system may be managed via a command line interface (not shown) or management console 106. A user may interact with the integration system via API calls. A user application may interact with the integration system via API calls, webhooks, SDKs, or the like. In various embodiments, the integration system is able to directly read to and write from configuration data store 140. The following figure shows an example process for building and managing user-facing integrations in software applications.

FIG. 2 is a flow diagram illustrating an embodiment of a process for building and managing user-facing integrations in software applications. The process may be performed by a system such as the integration system 100 of FIG. 1 or a processor such as processor 1202 shown in FIG. 12.

In the example shown, the process begins by using configuration data associated with an end user of a first party service to determine a manner in which to obtain data of the end user from a third party data source for use in providing a service of the first party service to the end user (200). The configuration data may define a manner in which data is made available to the third party data source, a manner in which the third party data source interacts with the integration system, among other things. Examples of configuration data are further described herein, e.g., with respect to FIG. 1.

In various embodiments, a history of the configuration data is maintained. For example, the configuration data includes a source code file stored in a source control repository, and the source code file is version controllable. The process may determine a current version of the configuration data including by using tracking information of the source control repository. The disclosed system can also maintain its own record of the version history of the configuration data.

In various embodiments, the process tracks the configuration data, determines another manner in which to obtain the data of the end user from a third party data source, and makes another call to the third party data source based at least in part on the determined other manner in which to obtain the data of the end user. For example, a configuration file may be updated, causing the manner in which to obtain the data of the end user from the third party data source to change. The process recognizes such changes in the configuration file and implements the changes by updating the manner in which to interact with the third party data source.

In various embodiments, the configuration data is customizable. For example, the configuration data includes at least one of: a custom field or a custom object. The custom field or object may be defined by the end user with respect to the third party data source. The system offers end users the ability to customize the behavior of their integrations, including but not limited to:

configuration of which data field from their third party application can be read and written, custom object/record, and custom field mapping (e.g., mapping a custom record in Netsuite to a concept in the first party service), creation of custom objects/records or custom fields as a part of the integration install process, and custom logic for data sanitization or transformation.

An application builder may specify the parameters for configuration inside the configuration files. An end user's configuration is stored, e.g., in configuration data store 140, and the application builder can access the stored data through queries or API calls.

The process obtains the data of the end user, including by making a call via the communication interface to the third party data source based at least in part on the determined manner in which to obtain the data of the end user (202). The manner in which to obtain data of the end user from a third party data source may include an instruction (such as an API call) for the third party data source to perform a function. For example, the configuration data includes a parameter associated with the API call. The parameter includes at least one of: a frequency of making the API call or a request attribute. The manner of interaction with the third party data source may include reading data, writing data, subscribing to event updates, among other things.

In various embodiments, the process transforms the data of the end user based at least on the configuration data. For example, data is transformed in a way indicated by the configuration data. The transformation may be defined by user logic. The transformation may include sanitizing the data. In various embodiments, the configuration data includes a custom field and/or a custom object associated with the end user indicating a manner in which to transform the data of the end user. The process may determine a custom field mapping including by mapping a custom record to a concept in the third party data source. Examples of customizations and data transformations are further described herein, e.g., with respect to FIGS. 3A and 3B.

The process uses the obtained data to provide the first party service to the end user (204). For example, the process performs, for the end user, an action associated with the first party service. The parameters of the action such as frequency may be specified by the configuration data.

The process may perform optimizations based on logic that is specific to particular third party data sources or groups of third party data sources or based on machine learning. For example, there may be separate rules for each third party data source. One instance of a third party data source may have a higher quota than another instance. Patterns of use with respect to the third party data source may be analyzed or used as machine learning training data to make appropriate adjustments and optimizations for the integration.

In various embodiments, the configuration data is associated with an embeddable user interface. For example, configuration data may be collected via the embeddable user interface or displayed through the embeddable user interface. That is, the process may output data associated with an embeddable user interface. The embeddable user interface is displayable to the end user in a context of the first party service. Examples of embeddable user interfaces are shown in FIGS. 5A-7.

As described herein, an integration system may support a plurality of end users, first party services, and third party data sources. In other words, the end user referred to in the process of FIG. 2 may be one of a plurality of end users. Configuration data for that end user may be different from configuration data for another end user. That is, the first configuration data associated with a first user of the plurality of end users is different from a second configuration data associated with a second user of the plurality of end users. The first party service is one of a plurality of first party services and the processor is further configured to determine a respective configuration data associated with the first party service.

FIG. 3A shows an example of a configuration file. As described herein, integrations may be defined in a configuration file. The configuration file may be in various formats such as a YAML file or JSON file. The configuration file shown here is merely exemplary and not intended to be limiting. The configuration file may be created by a builder, and instructions in the configuration file cause the integration system to read a set of core objects from a third party data source (e.g., a SaaS platform). By way of non-limiting example, objects include account, contact, lead, and opportunity. For each of the objects, the process defines a name for the object, a destination, and a schedule. Each object may have a corresponding name, destination, schedule, field (which may be further classified as required or optional), mappings, etc. Configuration files have the flexibility to allow a creator or editor of the file to define various customizations and data transformations, which may be different from the ones described herein.

In the examples shown in FIGS. 3A and 3B, there are four integrations. FIG. 3A shows the first integration (INTEGRATION 1), which is an integration with third party data source TP1 to read account and contact information and write to a third party relational data store DB1. A builder may define a name for this integration (read-account-contact-from-TP1) along with one or more of: a display name, a type, a provider (e.g., third party data source), an API, and frequency (e.g., the frequency to perform reads in this example). In various embodiments, the frequency may be specified for each object rather than for each integration. Example values for each parameter are shown.

In this example, there are two objects: "account" and "contact." For the account object, the builder may define a destination such as the DB1 table to write to (here, "TP1 Accounts"). Other examples of destinations include a webhook or data warehouse. The destination may be local, e.g., where the integration system hosts data on behalf of the first party service. The application builder may define required fields and optional fields. Required fields are those that must be read from the third party data source, while optional fields are those that a builder may choose to read or omit. Here, three fields are required: name, industry, and mailing address. The application builder defines a transformation to apply to the name field, which is to capitalize the names. A function "capitalizeNames.js" is applied. The function may be from a library or may be a custom function defined by the builder. The function may be defined in various languages such as Javascript or TypeScript. For example, the function takes a raw name from TP1 and returns a transformed version by capitalizing every word of the raw name. Here, one field is optional: annualRevenue. Other non-limiting examples of transformations include: converting currency from one type to another (e.g., USD to Euro), and converting time stamp to a different time zone.

In various embodiments, the builder may define one or more calculated fields, which is a field that does not exist in the third party data source, but is determined from other fields using a function such as a custom function. Here, a calculated field is "priority," which is determined using a function "calcPriorityFromIndustryAndAddress.js." Similar to the "capitalizeNames.js" function, this function may be from a library or may be custom and may be defined in various languages. In this example, the calculate priority function takes an object with all the fields read from TP1, determines the industry and country, and if the country is the USA and the industry is eCommerce, then the priority is "high," while all others are "low" priority. This causes accounts from USA that are eCommerce to be labeled as high priority.

Referring now to the "contact" object, the application builder defines a custom field. In this example, a prompt is displayed to an end user in an embeddable UI, the response to which is mapped to DB1 column "pronoun." Referring briefly to FIG. 5C, the prompt 510 is shown in the embeddable UI.

FIG. 3B shows an example of a configuration file. This is a continuation of the configuration file shown in FIG. 3A. Three more integrations (INTEGRATION 2, INTEGRATION 3, and INTEGRATION 4) are shown. Each of the integrations are like the one in FIG. 3A unless otherwise described. Similar to the custom field defined for INTEGRATION 1, in INTEGRATION 2, a custom object for emails is defined. A corresponding example prompt is shown in FIG. 5D. Unlike INTEGRATION 1 and INTEGRATION 2, which are DB1-based integrations. INTEGRATION 3 and INTEGRATION 4 are HTTP integrations.

As described herein, configuration data may be updated via a command line interface, among other things. For example, a new configuration file with changes to INTEGRATION 3 (notifyToEndpoint) and INTEGRATION 4 (writeFromEndpoint) is deployed with the following command: & amp deploy prod.

Sample output is:

Deploying new version of amp.yaml, updating 2 integrations . . . notifyToEndpoint integration updated. We will post data to the following URLs:

my-saas.com/webhooks/new-CRM1-contact.

my-saas.com/webhooks/updated-CRM1-contact.

my-saas.com/webhooks/deleted-CRM1-contact.

writeFromEndpoint integration updated. Remote API endpoint updated:

withampersand.com/customers/23sd3/integration/ 13ksw3/create-CRM1-contact

Make a POST request to this URL to trigger the integration.

Go to console.withampersand.com/embeds to see the embeddable set up and configuration UI components for these integrations.

An integration may installed by the end user when the builder integrates a React® library into the front end application of the first party service. For example, the integration (e.g., configuration data) is wrapped inside the integration system provider. The builder provides a project ID and API key to the React library, to enable the React library to communicate with the integration system. An application builder may assign an integration name, user ID, name, org ID, org name, etc.

FIG. 4A shows an example of a user interface for displaying an integration installation component. The user interface may be accessed by or via a first party service such as an end user associated with the first party service. The user interface may be provided by an integration system such as the system 100 shown in FIG. 1. In this example, a user (e.g., an end user for a first party service) may input its third party data source domain into space 402. The builder may then click Submit, and log into a third party data source with their credentials, causing the user interface to be updated. The authentication and credential verification process may be based on a standard protocol such as OAuth. Following the deployment (associated with this user interface), the builder may provide further input to complete installation of the integration as described in the next figure.

FIG. 4B shows an example of a user interface for displaying an integration configuration console. The user interface shows current integrations with a third party data source, TP1. The information shown here is based on the configuration file of FIG. 3A. The objects 410 are "account" and "contact." The user may input further information to complete installation of the integration. The right side of the user interface shows details associated with the "account" object. The fields 412 are those required fields defined in FIG. 3A for the account object of INTEGRATION 1. In this example, the user is able to customize reads, updates, and new record creations. For example, the user may drag and drop the fields between the categories "read and update," "read," and "update." The user may select the icon/button next to "add new records," to create new records.

In various embodiments, the user interface includes a mapping area 414 to solicit information from the user to define a mapping. Based on the defined mapping, the integration system maps a field from a third party data source instance that is associated with the first party service to a concept of the integration system. The dropdown list of options may be populated based on the third party data source instance that the user logged into. Although not shown in FIG. 3A, the configuration file may allow a user to select one of their fields to map/use as the "name" field. Corresponding configuration file code may be:

mapToName: accountId
    mapToDisplayName: Account ID
    prompt: Which field is the identifier for the account?
        These IDs allow us to match TP1 Objects to our
        Accounts and Users.

In various embodiments, the builder may specify limitations with respect to mapping such as once you select a field, you cannot change it. The user interface may present a user with a list of all of the fields for their third party data source instance. The user can pick and choose which ones they want the integration system to read. Optionally, specific fields may be enumerated as options.

FIGS. 5A to 5E show examples of an embeddable user interface for building and managing user-facing integrations in software applications. As shown in these examples, the embeddable user interface is configured to solicit input from an end user to indicate the manner in which to obtain data of the end user from a third party data source. An integration system uses the sample configuration file shown in FIGS. 3A and 3B to generate the embeddable set-up UI for the TP1 integration (integrations #1 and #2) as shown here. After set-up, the end user can reconfigure their integration at any time via an embeddable reconfiguration UI, or the first party service (e.g., a member of an end-user-facing team) can reconfigure the integration on their behalf via a management console.

FIG. 6 shows an example of an embeddable user interface for building and managing user-facing integrations in software applications. This user interface may be accessed by an end user of a first party service to facilitate integration troubleshooting and management, among other things. In this example, the first party service is "evabot," and the user interface displayed here can be viewed by an end user of the first party service to manage their own integration, see recent activity, and troubleshoot issues. For example, the current state of the user interface displays three integrations: one integration with TP1, one integration with TP2, and one integration with TP3. The integrations with TP2 and TP3 are collapsed, while the integration with TP1 is expanded.

In various embodiments, the integration system is configured to determine a cause of a status associated with an integration, and the data associated with the embeddable user interface includes the determined cause. In this example, each of the integrations has an associated status tag. The status 602 (e.g., connection status) associated with TP1 is "broken," and this may be visually distinguished from other types of status by using a different color or shading. In this example, the user interface displays an overview of the integration with third party data source TP1 including recent activity and a most likely cause of the status (broken). "History" and "Settings" may be selected to view other aspects of the integration. A user may select the retry sync button 604 to reattempt a sync with the third party data source TP1. The embeddable UI shown in this example may be made available to a first party service (e.g., a builder) as a ready-to-use component, as underlying data to power a UI (e.g., a React® hook), or as a raw API. The following figure shows what a documentation page for a builder may look like.

Figure 7:
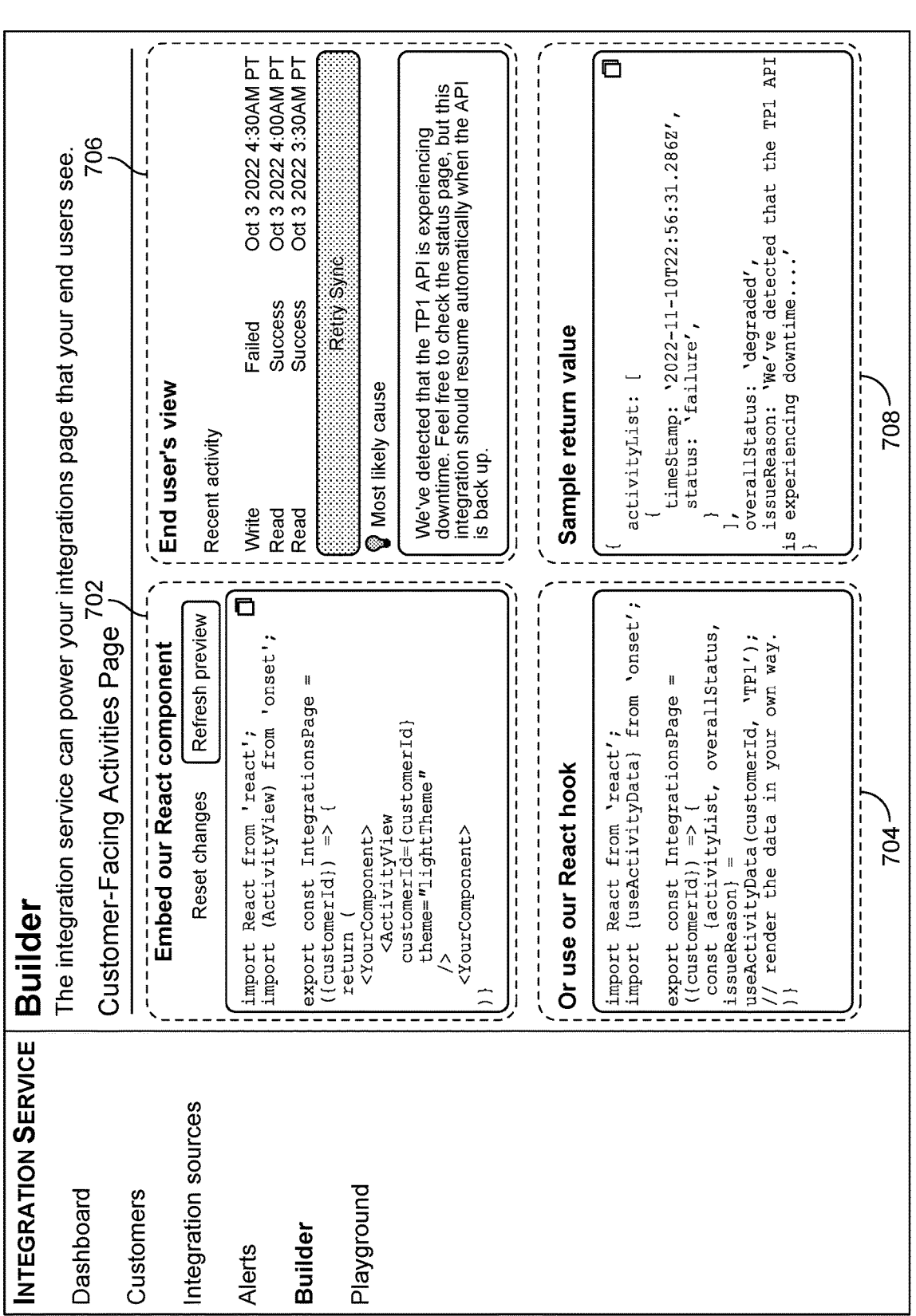
FIG. 7 shows an example of a user interface for building and managing user-facing integrations in software applications including embeddable user interfaces.

FIG. 7 shows an example of a user interface for building and managing user-facing integrations in software applications including embeddable user interfaces. The user interface may be accessed by a first party service such as a builder associated with the first party service. In this example, various embeddable UIs or data associated with embeddable UIs are shown. An embeddable UI may be a ready-to-use component 702, as underlying data to power a UI (e.g., a React® hook) 704, or as a raw API. An example of an end user's view 706 is shown, as well as a sample return value 708. Providing at least some of this information on the same page facilitates the builder's understanding and development of the embeddable UIs.

Figure 8:
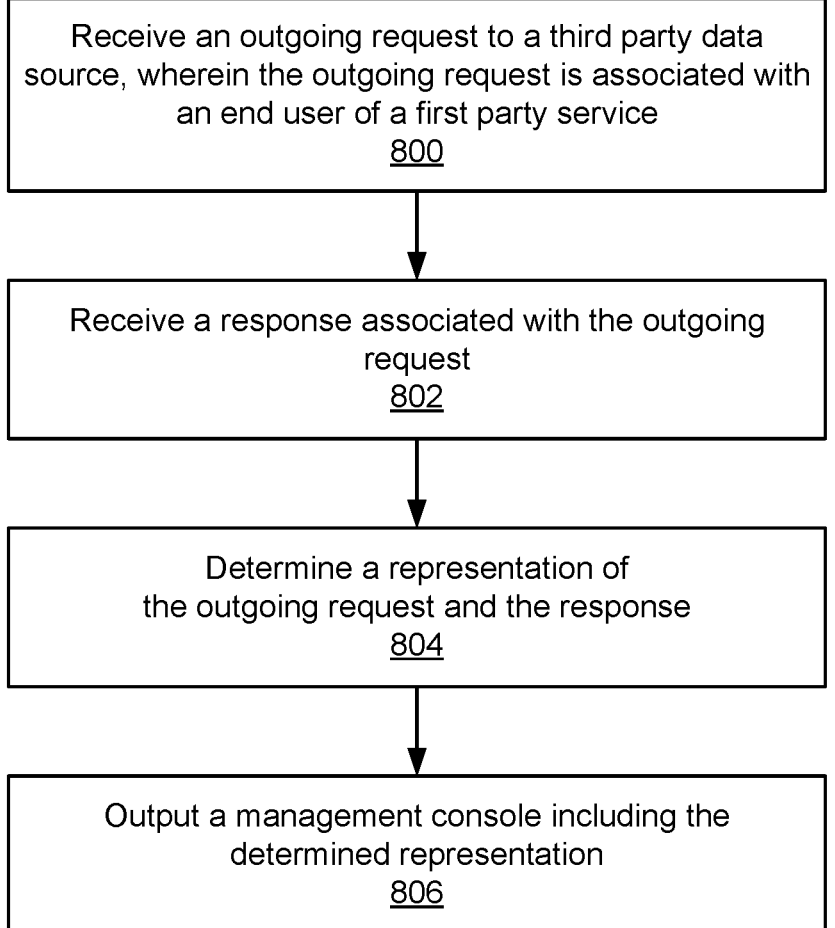
FIG. 8 is a flow diagram illustrating an embodiment of a process for providing a management console.

FIG. 8 is a flow diagram illustrating an embodiment of a process for providing a management console. An integration system as disclosed herein may be used to build and manage user-facing integrations in software applications. A management console may be provided and used independently from the integrations or may be used in conjunction with the integrations developed using the integration system. Builders can use the management console even if they have built their integrations manually through code. The process may be performed by a system such as the management console engine 106 of FIG. 1 or a processor such as processor 1202 shown in FIG. 12. The process may be performed as part of another process, such as part of the process of FIG. 2.

The process begins by receiving an outgoing request to a third party data source, wherein the outgoing request is associated with an end user of a first party service (800). In various embodiments, the process registers a new installation of an integration with a third party data source. For example, the first party service information, user within first party service, and associated workspace may be included in the registration of the new installation. For this specific installation, the process may then track outgoing requests and corresponding responses.

Figure 9A:
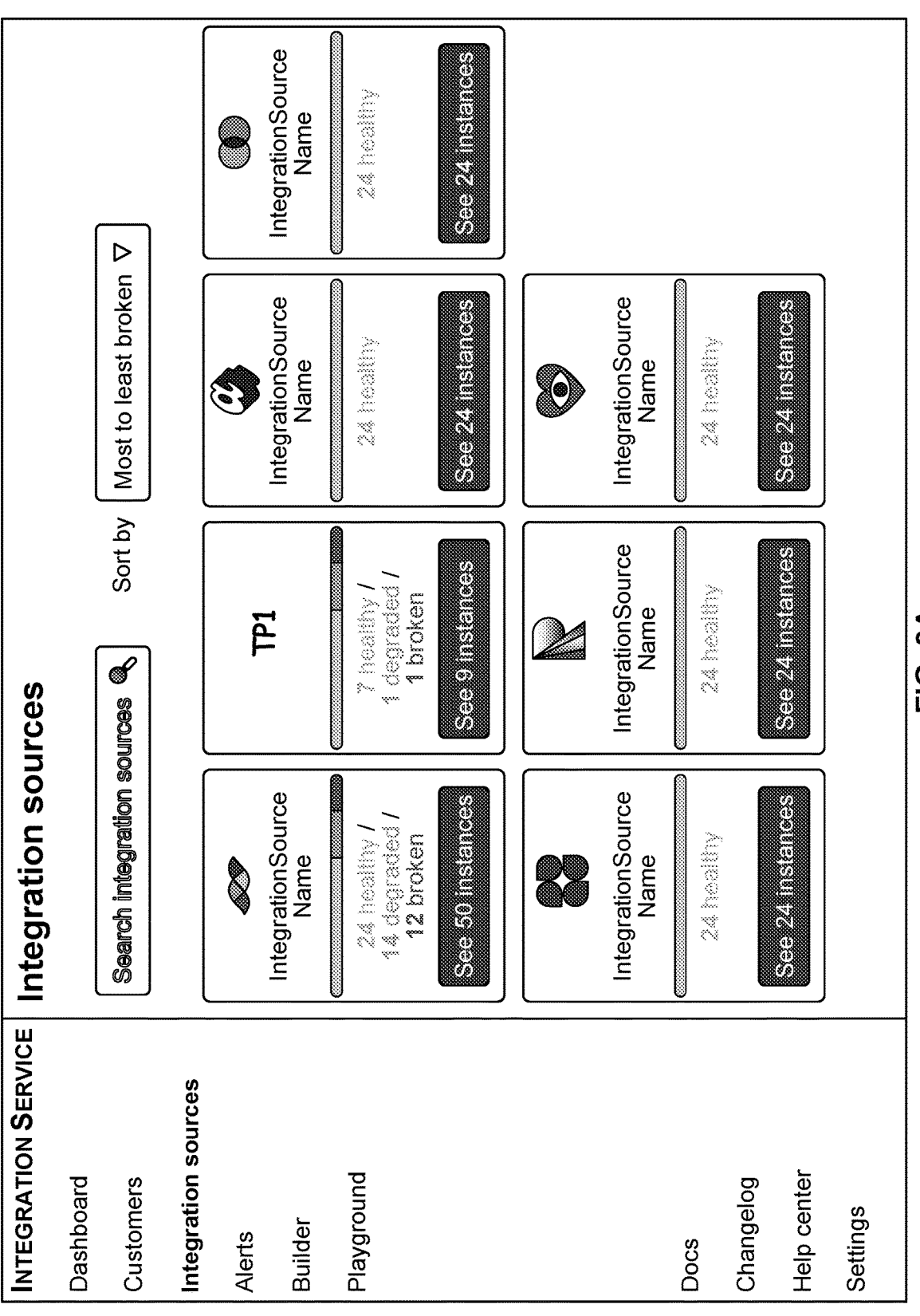
FIG. 9A shows an example of an integration sources section of a management console for an integration system.

The process receives a response associated with the outgoing request (802). The response may be tracked by parsing the response and storing the information in a data store. The response is stored in association with the registered installation. The outgoing request observed at 800 and the response observed at 802 may be used to drive the data displayed in the management console, examples of which are shown in FIGS. 9A to 11. Referring briefly to FIG. 9B, the outgoing request and response information is collected to determine activity and status for each of the customers (first party services) with respect to the third party source TP1.

Returning to FIG. 8, the process determines a representation of the outgoing request and the response (804). Referring to the example of FIG. 9B, the first party service "InteractApp" makes several requests and receives responses from third party data source TP1 over the past six days. This activity is observed. Suppose some of the responses are failures or errors. The number of errors may be tracked and visually represented in a different color. Each square in the "Activity in past 6 days" column may be colored to represent the health status. The square on the left side corresponds to earlier activity while the square on the right side corresponds to later activity. Thus, the squares represent activity over time, moving from left to right with a color indicating the health of the activity. For "InteractApp," the oldest activity is healthy (e.g., green) because there were no or very few error responses. In the middle, there were more errors, as indicated by the different shaded (e.g., orange) squares. On the right side (most recently), the activity is healthy again. Thus, the current status is "Healthy" as shown.

The process outputs a management console including the determined representation (806). The management console includes visual representations of the integrations and associated activity. Further examples are described with respect to FIGS. 9A to 11.

In various embodiments, the process optionally registers an installation of at least one integration including by providing middleware configured to connect to the first party service. For example, an application builder uses a middleware provided by the process or an integration system such as system 100 shown in FIG. 1. The middleware reads API requests and responses, and provides this information via a Management Console thus allowing the application builder to monitor and troubleshoot integrations.

In various embodiments, the process tracks a subset of integrations rather than all integrations. For example, registering the installation of the integration includes defining specific integrations to observe, or specific integrations are indicated for tracking. The middleware may operate through global injection as follows. An application builder specifies which integrations are to be tracked by the integration system instead of permitting tracking of all integrations. This gives the application builder greater control over the granularity of tracking. For example, the integration system does not have access to all external API calls, but rather only the ones specified by the application builder. The middleware may be programmed to extract relevant information (e.g., customer and workspace ID) from a request sent to one or more third party data sources, and observing corresponding responses.

FIGS. 9A to 9H show examples of an integration sources section of a management console for an integration system. FIG. 9A shows a summary of the integration sources, which are the third party data sources for a particular first party service. In this example, each integration source is displayed along with a visualization of the health status. They may be ordered by most to least broken (as shown) or in another order. Upon selecting the "See 9 instances" button for "TP1," the user interface of FIG. 9B is displayed. The details of TP1 are displayed including, for example, its overall health status (here, "healthy"), recommended action, and the number of instances (here, nine) and end users (here they are called "customers" and there are eight). Selecting, "See details" for the first row (InteractApp) causes the user interface of FIG. 9C to be displayed. This enables a user to drill down into the details of the first row by viewing operations and their associated status along with data and the time the operations were made.

As shown in FIG. 9D, selecting "Schedule & Config" displays aspects of the integration such as the next scheduled sync, API quota implications, and the objects and fields and other configuration values for the end user. As shown in FIG. 9E, selecting "Auth Details" displays information about the connection, credentials, and security aspects of the connection to the third party data source. As shown in FIG. 9F, selecting "Alert Channels" displays information about and allows a user to customize how to receive alerts about the integration.

Figure 9H:
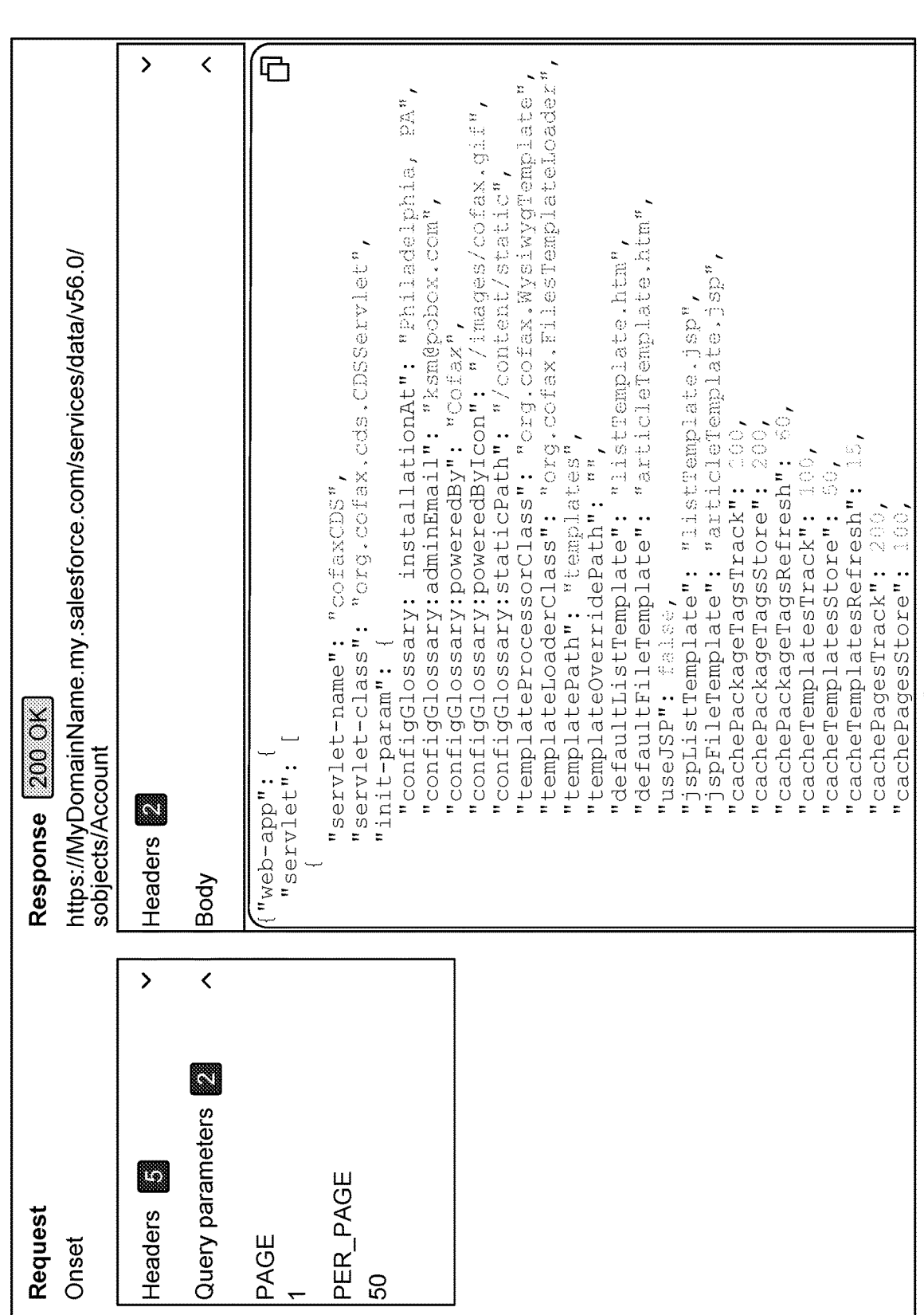
FIG. 9H shows an example of an integration sources section of a management console for an integration system.

FIG. 9G shows a different example corresponding to the user interface of FIG. 9C. Here, a timeline is displayed on the left-hand side to facilitate quick and easy browsing of various events over a range of time. Selecting 902 causes a pop-up window to be displayed showing details of the operation as shown in FIG. 9H.

Figure 10A:
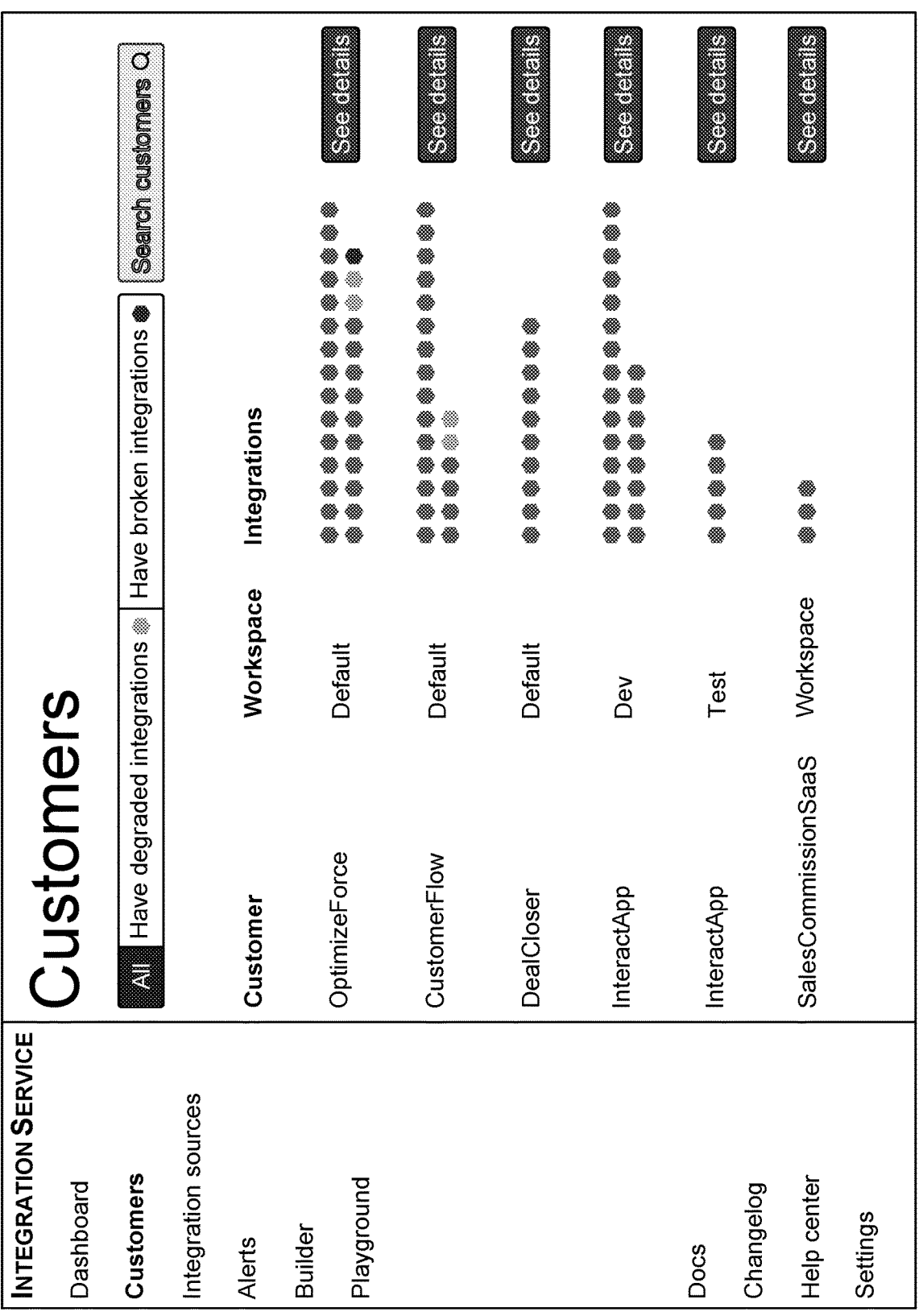
FIG. 10A shows an example of an end user section of a management console for an integration system.

FIGS. 10A to 10C show examples of an end user section of a management console for an integration system. A customer is also referred to herein as an end user of a first party service. In the example of FIG. 10A, information about integrations is organized by end users. A particular end user may have several integrations and viewing the data in this manager facilitates troubleshooting and management. Here, each row corresponds to a particular end user. The end user is displayed along with a workspace and a visualization of their integrations. The visualization of the integrations may include a symbol representing the health status of the integration.

FIG. 10B shows an example of an alternative way to display the information of FIG. 10A. In this example, each integration is displayed in a column and the page may be scrollable to view additional integrations. For example, the integration with TP1 is shown in the third column, where the status is "broken."

FIG. 10C shows an example of another way to display information about integration instances for a particular end user. In this example, each row corresponds to a particular integration and the activity includes symbols representing the health status.

Figure 11:
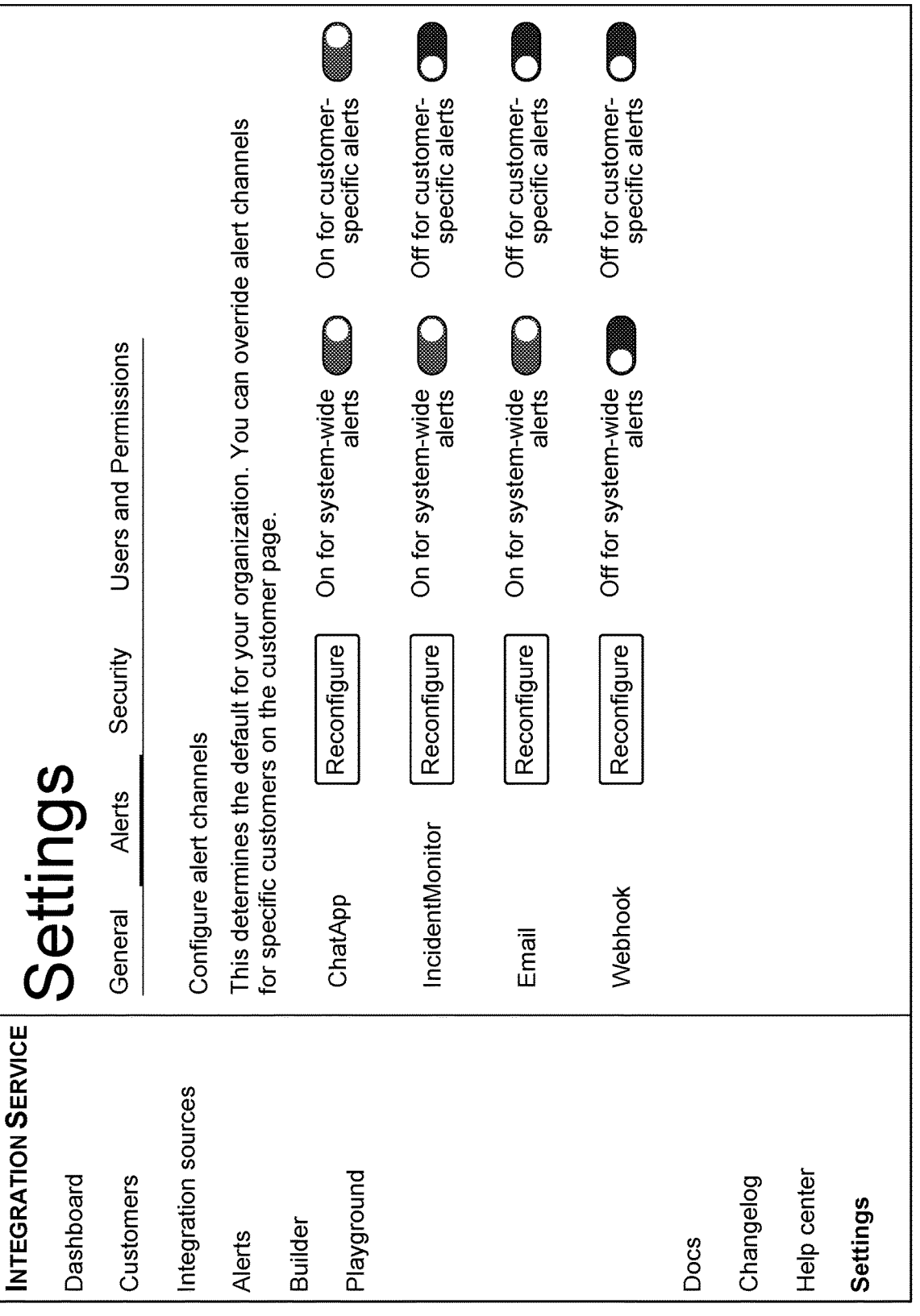
FIG. 11 shows an example of a settings section of a management console for an integration system.

FIG. 11 shows an example of a settings section of a management console for an integration system. This example is similar to the one shown in FIG. 9F, allowing a builder to specify how an alert is made either for all of its end users or for a specific end user.

Figure 12:
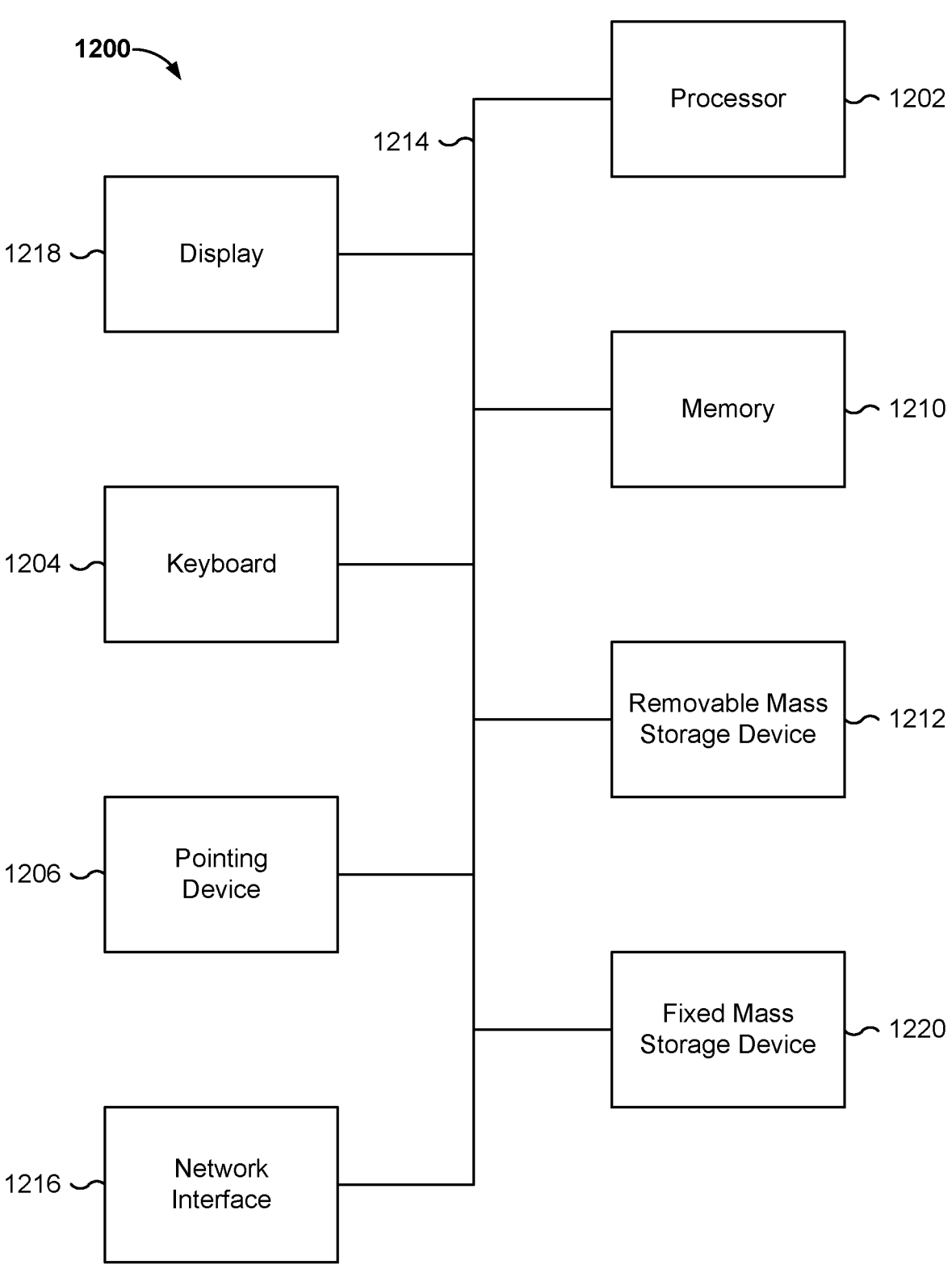
FIG. 12 is a functional diagram illustrating a programmed computer system for building and managing user-facing integrations in software applications in accordance with some embodiments.

FIG. 12 is a functional diagram illustrating a programmed computer system for building and managing user-facing integrations in software applications in accordance with some embodiments. As will be apparent, other computer system architectures and configurations can be used to build and manage user-facing integrations in software. Computer system 1200, which includes various subsystems as described below, includes at least one microprocessor subsystem (also referred to as a processor or a central processing unit (CPU)) 1202. For example, processor 1202 can be implemented by a single-chip processor or by multiple processors. In some embodiments, processor 1202 is a general purpose digital processor that controls the operation of the computer system 1200. Using instructions retrieved from memory 1210, the processor 1202 controls the reception and manipulation of input data, and the output and display of data on output devices (e.g., display 1218). In some embodiments, processor 1202 includes and/or is used to provide integration system 100 of FIG. 1 and/or execute/perform the processes described herein with respect to FIGS. 2 and 8.

Processor 1202 is coupled bi-directionally with memory 1210, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1202. Also as is well known in the art, primary storage typically includes basic operating instructions, program code, data and objects used by the processor 1202 to perform its functions (e.g., programmed instructions). For example, memory 1210 can include any suitable computer-readable storage media, described below, depending on whether, for example, data access needs to be bi-directional or uni-directional. For example, processor 1202 can also directly and very rapidly retrieve and store frequently needed data in a cache memory (not shown).

A removable mass storage device 1212 provides additional data storage capacity for the computer system 1200, and is coupled either bi-directionally (read/write) or uni-directionally (read only) to processor 1202. For example, storage 1212 can also include computer-readable media such as magnetic tape, flash memory, PC-CARDS, portable mass storage devices, holographic storage devices, and other storage devices. A fixed mass storage 1220 can also, for example, provide additional data storage capacity. The most common example of mass storage 1220 is a hard disk drive. Mass storage 1212, 1220 generally store additional programming instructions, data, and the like that typically are not in active use by the processor 1202. It will be appreciated that the information retained within mass storage 1212 and 1220 can be incorporated, if needed, in standard fashion as part of memory 1210 (e.g., RAM) as virtual memory.

In addition to providing processor 1202 access to storage subsystems, bus 1214 can also be used to provide access to other subsystems and devices. As shown, these can include a display monitor 1218, a network interface 1216, a keyboard 1204, and a pointing device 1206, as well as an auxiliary input/output device interface, a sound card, speakers, and other subsystems as needed. For example, the pointing device 1206 can be a mouse, stylus, track ball, or tablet, and is useful for interacting with a graphical user interface.

The network interface 1216 allows processor 1202 to be coupled to another computer, computer network, or telecommunications network using a network connection as shown. For example, through the network interface 1216, the processor 1202 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1202 can be used to connect the computer system 1200 to an external network and transfer data according to standard protocols. For example, various process embodiments disclosed herein can be executed on processor 1202, or can be performed across a network such as the Internet, intranet networks, or local area networks, in conjunction with a remote processor that shares a portion of the processing. Additional mass storage devices (not shown) can also be connected to processor 1202 through network interface 1216.

An auxiliary I/O device interface (not shown) can be used in conjunction with computer system 1200. The auxiliary I/O device interface can include general and customized interfaces that allow the processor 1202 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 12 is but an example of a computer system suitable for use with the various embodiments disclosed herein. Other computer systems suitable for such use can include additional or fewer subsystems. In addition, bus 1214 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

In various embodiments, a system as disclosed herein operates over all or part of the entire lifecycle of an integration. A typical integration lifecycle includes the following stages: development, testing, and deployment; customer onboarding; and customer support. The development, testing, and deployment stage may include one or more of the following:

Create API connectors and template modules

Host integration services, e.g., managing retries, error handling, API quota management, queuing, etc.

Sandboxes and test data

Command line interface (CLI) for testing and deployment

Hosted integration data store

The customer onboarding stage may include one or more of the following:

User- and integration-specific configuration store

Embeddable authentication components

Embeddable UIs for creating and editing configuration and object mapping

The customer support stage may include one or more of the following:

Integration observability, troubleshooting, and issue alerting

In-app alerting for end users

The disclosed techniques may be applied to add Software as a Service (Saas) interoperability to a SaaS software application.

What is claimed is:

1. A system, comprising:
   a communication interface; and
   a processor coupled to the communication interface and configured to:

use configuration data associated with an end user of a first party service to determine a manner in which to obtain data of the end user from a third party data source for use in providing a service of the first party service to the end user;

obtain the data of the end user, including by making a call via the communication interface to the third party data source based at least in part on the determined manner in which to obtain the data of the end user;

use the obtained data to provide the first party service to the end user;

receive an outgoing request to the third party data source, wherein the outgoing request is associated with the end user of the first party service;

receive a response associated with the outgoing request;

determine a representation of the outgoing request and the response;

register an installation of at least one integration including by providing middleware configured to connect to the first party service; and output a management console including the determined representation.

2. The system of claim 1, wherein:

the configuration data includes a source code file stored in a source control repository; and the source code file is version controllable.

3. The system of claim 2, wherein the processor is further configured to determine a current version of the configuration data including by using tracking information of the source control repository.

4. The system of claim 1, wherein the configuration data is obtained at least in part via a command line interface.

5. The system of claim 1, wherein the processor is further configured to:

track the configuration data;

determine another manner in which to obtain the data of the end user from the third party data source; and make another call to the third party data source based at least in part on the determined other manner in which to obtain the data of the end user.

6. The system of claim 1, wherein the configuration data includes at least one of: a custom field or a custom object, defined by the end user with respect to the third party data source.

7. The system of claim 1, wherein using the obtained data to provide the first party service to the end user includes performing, for the end user, an action associated with the first party service.

8. The system of claim 1, wherein the manner in which to obtain the data of the end user from the third party data source includes an instruction for the third party data source to perform a function.

9. The system of claim 8, wherein:

the manner in which to obtain the data of the end user from the third party data source includes an application programming interface (API) call;

the configuration data includes a parameter associated with the application programming interface (API) call; and the parameter includes at least one of: a frequency of making the API call or a request attribute.

10. The system of claim 1, wherein the processor is further configured to transform the data of the end user based at least on the configuration data.

11. The system of claim 1, wherein the configuration data includes at least one of: a custom field or a custom object associated with the end user indicating a manner in which to transform the data of the end user.

12. The system of claim 1, wherein the processor is further configured to determine a custom field mapping including by mapping a custom record to a concept in the third party data source.

13. The system of claim 1, wherein:

the end user is one of a plurality of end users; and a first configuration data associated with a first user of the plurality of end users is different from a second configuration data associated with a second user of the plurality of end users.

14. The system of claim 1, wherein the first party service is one of a plurality of first party services and the processor is further configured to determine a respective configuration data associated with first party service.

15. The system of claim 1, wherein:

the configuration data is associated with an embeddable user interface; and the embeddable user interface is displayable to the end user in a context of the first party service.

16. The system of claim 15, wherein the embeddable user interface is configured to solicit input from the end user to indicate the manner in which to obtain the data of the end user from a third party data source.

17. The system of claim 15, wherein the processor is further configured to output data associated with the embeddable user interface.

18. A method, comprising:

using configuration data associated with an end user of a first party service to determine a manner in which to obtain data of the end user from a third party data source for use in providing a service of the first party service to the end user;

obtaining the data of the end user, including by making a call to the third party data source based at least in part on the determined manner in which to obtain the data of the end user;

using the obtained data to provide the first party service to the end user; and receiving an outgoing request to the third party data source, wherein the outgoing request is associated with the end user of the first party service;

receiving a response associated with the outgoing request;

determining a representation of the outgoing request and the response;

registering an installation of at least one integration including by providing middleware configured to connect to the first party service; and outputting a management console including the determined representation.

19. A computer program product embodied in a non-transitory computer readable medium and comprising computer instructions for:

using configuration data associated with an end user of a first party service to determine a manner in which to obtain data of the end user from a third party data source for use in providing a service of the first party service to the end user;

obtaining the data of the end user, including by making a call via to the third party data source based at least in part on the determined manner in which to obtain the data of the end user;

using the obtained data to provide the first party service to the end user;

receiving an outgoing request to the third party data source, wherein the outgoing request is associated with the end user of the first party service;

receiving a response associated with the outgoing request;

determining a representation of the outgoing request and the response; 5 registering an installation of at least one integration including by providing middleware configured to connect to the first party service; and outputting a management console including the determined representation. 10

* * * * *